United States Patent [19]
Nishio et al.

[11] Patent Number: 5,848,154
[45] Date of Patent: Dec. 8, 1998

[54] APPARATUS FOR MANAGING SOFTWARE USING QUANTITY

[75] Inventors: Nobuhiko Nishio; Tetsu Tanizawa; Kiyokatsu Iijima; Muneharu Gotou, all of Kawasaki, Japan

[73] Assignee: Fujitsu Limited, Kawasaki, Japan

[21] Appl. No.: 502,354

[22] Filed: Jul. 14, 1995

[30] Foreign Application Priority Data

Aug. 10, 1994 [JP] Japan .................................. 6-219367

[51] Int. Cl.⁶ .............................. H04L 9/00; H04L 9/06
[52] U.S. Cl. .................................... 380/4; 380/9; 380/10; 380/20; 380/23; 380/25; 380/29; 380/49
[58] Field of Search .................... 380/4, 23, 24, 380/25, 49, 50, 29, 9, 10, 20

[56] References Cited

U.S. PATENT DOCUMENTS

| | | |
|---|---|---|
| 4,247,106 | 1/1981 | Jeffers et al. . |
| 4,439,670 | 3/1984 | Basset et al. . |
| 4,446,519 | 5/1984 | Thomas . |
| 4,484,217 | 11/1984 | Block et al. . |
| 4,558,176 | 12/1985 | Arnold et al. . |
| 4,590,557 | 5/1986 | Lillie . |
| 4,646,234 | 2/1987 | Tolman, et al. . |
| 4,649,510 | 3/1987 | Schmidt . |
| 4,654,799 | 3/1987 | Ogaki, et al. . |
| 4,658,093 | 4/1987 | Hellman . |
| 4,672,554 | 6/1987 | Ogaki . |
| 4,674,055 | 6/1987 | Ogaki, et al. . |
| 4,740,890 | 4/1988 | William . |
| 4,780,905 | 10/1988 | Cruts, et al. . |
| 4,787,050 | 11/1988 | Suzuki . |
| 4,816,653 | 3/1989 | Anderl, et al. . |
| 4,816,654 | 3/1989 | Anderl, et al. . |
| 4,817,140 | 3/1989 | Chandra, et al. . |
| 4,827,508 | 5/1989 | Shear .......................................... 380/4 |
| 4,864,516 | 9/1989 | Gaither, et al. . |
| 4,879,645 | 11/1989 | Tamada, et al. . |
| 4,949,257 | 8/1990 | Orbach . |
| 4,977,594 | 12/1990 | Shear .......................................... 380/4 |
| 4,999,806 | 3/1991 | Chernow, et al. . |
| 5,006,849 | 4/1991 | Baarman, et al. . |
| 5,008,814 | 4/1991 | Mathur . |
| 5,014,234 | 5/1991 | Edwards, Jr. . |
| 5,016,009 | 5/1991 | Whiting, et al. . |
| 5,050,213 | 9/1991 | Shear .......................................... 380/25 |
| 5,051,822 | 9/1991 | Rhoades . |
| 5,056,009 | 10/1991 | Mizuta . |
| 5,103,392 | 4/1992 | Mori . |
| 5,103,476 | 4/1992 | Waite, et al. . |
| 5,166,886 | 11/1992 | Molnar, et al. . |
| 5,181,107 | 1/1993 | Rhoades . |
| 5,199,066 | 3/1993 | Logan . |
| 5,214,697 | 5/1993 | Saito . |
| 5,222,134 | 6/1993 | Waite, et al. . |
| 5,245,330 | 9/1993 | Wassink . |
| 5,267,171 | 11/1993 | Suzuki et al. . |
| 5,410,598 | 4/1995 | Shear .......................................... 380/4 |

FOREIGN PATENT DOCUMENTS

| | | |
|---|---|---|
| 57-127249 | 8/1982 | Japan . |
| 5-89363 | 4/1993 | Japan . |
| 5-266575 | 10/1993 | Japan . |
| 5-298085 | 11/1993 | Japan . |
| 6-95871 | 4/1994 | Japan . |

OTHER PUBLICATIONS

English Abstracts of Japanese Patents 1–166218, 5–298085 & 6–95871.

*Primary Examiner*—Bernarr E. Gregory
*Attorney, Agent, or Firm*—Staas & Halsey

[57] ABSTRACT

A DES decrypting unit decrypts video data frames encrypted and compressed based on MPEG standards, when receiving them. The decrypted video data frames are expanded one by one in a MPEG expansion circuit. Each time the single frame is expanded, the MPEG expansion circuit outputs a completion-of-frame-expansion signal to a host control CPU. The host control CPU counts the completion-of-frame-expansion signals and reduces an accounting count value in an accounting data memory in accordance with this count value. The host control CPU output character pattern image data from a pattern generator when the accounting count value becomes 0. The character pattern image data is superimposed on a video signal in an adder circuit.

17 Claims, 19 Drawing Sheets

APPARATUS FOR MANAGING SOFTWARE USING QUANTITY

BACKGROUND OF THE INVENTION

1. Field of the Invention

The present invention relates generally to a software using quantity managing apparatus for managing a using quantity of software such as a computer program, and a picture work, especially digitized software. The present invention relates more particularly to a software using quantity managing apparatus capable of causing a software user, when a software using quantity exceeds a usable quantity predetermined based on an amount of money paid to a software rightful claimant by the software user, to recognize this effect.

2. Description of the Prior Art

With an advancement of a large scale storage medium such as a CD-ROM, etc. and of a large capacity high-speed communication technology such as a B-ISDN, etc., not only the computer program but also image data and audio data are distributed in the form of digital information via such a media. That is, there are sold CD-ROMs stored with a picture work as hitherto offered in the form of a video tape and a game program. Further, there is also actualized a sales system wherein such a picture work is delivered via a communication line to the user.

By the way, it is quite easy to copy this kind of digital information on other mediums, and, besides, a decline in terms of data quality due to copying as in the case of the analog information is not seen. Accordingly, absolutely the same information can be copied, and there exists a remarkably high possibility in which these acts infringe a profit of the author. Namely, a third party can easily copy the contents of the CD-ROM on other mediums with a mere knowledge about the computer operation simply by possessing a large capacity writable magneto-optic disk device and a magnetic disk device. As described above, in the majority of cases, a rental act of this kind of digital information medium is inhibited by the author for the reason of an impossibility of conducting a sufficient security check. Hence, an end user is not allowed to use the software as far as the end user does not purchase the software. However, this kind of software is expensive at the present. Therefore, the end user has no alternative but to refrain from purchasing the software till the user confirms that the software is identical with the one the user himself or herself really wants to get or usable by the hardware of his or her own. Consequently, collecting the profits from this kind of software tends to make little progress.

For obviating this situation, there starts a realization of a new software distributing system in which a CD-ROM stored with a multiplicity of sets of software restricted in terms of functions is put on the market at a low price, and the end user is informed of a code for canceling the functional restriction in exchange for a remittance of license fee for a right-of-use of a desired set of software among them. However, setting the right of use involves a difficulty of providing restrictions in a using term and the number of uses. Hence, there is no alternative but to set the right of use for the permanent use. Accordingly, this license fee is inevitably high as in the case of the conventional sales of the software.

In this respect, Japanese Patent Laid-Open Publication No.6-19707 discloses a system for previously registering an amount of money corresponding to a software usable quantity on an IC card. In this system, a user inserts this IC card into an information device usable (executable, reproducible) this software when using the software requiring a payment of money, and the software is made usable or unusable the software in accordance with a balance of the registered amount of money. According to this system, the information device permits the use of the software by canceling the functional restriction on condition that the registered amount of money is equal to or larger than the minimum limit amount needed for using the software. Further, the information device subtracts the balance of the registered amount of money each time the software is used once. According to this system, if the amount of money registered on the IC card becomes under the minimum limit amount needed for using the software as a result of subtracting, the software is again made unusable by stopping the cancellation of the functional restriction of the software. Therefore, in this case, all the outputs of the image, voice and the computer program from this information device are interrupted.

If all the outputs are thus interrupted, however, the software user is unable to recognize that this interruption is caused due to a failure in this information device or an end of the amount of money registered.

SUMMARY OF THE INVENTION

It is a primary object of the present invention to provide a software using quantity managing apparatus capable of hindering the use of the software while informing a software user of the fact that a software using quantity reaches a predetermined usable quantity by outputting data in an incomplete form if the software is used in excess of the predetermined usable quantity.

According to one aspect of the present invention, a software using quantity managing apparatus provided in an equipment for outputting a signal to the outside by use of software manages a using quantity of the software. The software using quantity managing apparatus comprises a software using quantity detecting unit for detecting the using quantity of the software and a determining unit for determining that the software using quantity detected by the software using quantity detecting unit reaches a predetermined using quantity. The same apparatus also comprises an output hindering unit for hindering a normal output of the signal to the outside when the determining unit determines that the software using quantity reaches the predetermined using quantity.

The software applicable to the present invention includes, in addition to a computer program, audio and/or video information like image data such as moving picture data of a movie, etc. and voice data of music, etc. The software may be encrypted or compressed beforehand. If the software is previously compressed, there may be employed an expansion mechanism for expanding and restoring the compressed software. If the software is previously encrypted, there may be a decoding mechanism for decoding the encrypted software. Further, data as the software may be in an analog or digital form. Note that the software applicable to this invention is desirably a program capable of making the user perceptible an image or a voice by outputting them when using the program or the image itself or the voice itself.

The equipment for outputting the signal to the outside may be a computer or an information device other than the computer. Accordingly, the equipment may be a video deck or a viewer capable of outputting a digital image and a voice.

A method by which the software using quantity detecting unit detects the software using quantity under what condition may be arbitrary. Further, a format of recording the detected using quantity may also be arbitrary, and there may be taken a construction of subtracting a count value in accordance with the software using quantity. For example, there may be taken a construction of counting the number of operations of expanding an image data frame compressed based on MPEG standards and subtracting a count value in accordance with the number of operations thereof. There may be also taken a construction of counting the number of operations of decoding encrypted data and subtracting a count value in accordance with the number of operations thereof. A construction of measuring a software using time and subtracting a count value in accordance with this using time may further be adopted. There may be still further adopted a construction of subtracting a usable limit amount each time the entire software is used once. However, using the software involves some output indications as a result of this, and the output thereof is associated with a service for the user. It is therefore desirable to count the image formed as an output of the software, or the number of transfer of a processing result of the software to a personal computer, etc. or the number of pieces of music in the case the software is sound of music or the like.

The determining unit determines whether or not the software using quantity reaches the predetermined using quantity. The predetermined using quantity may be set corresponding to an amount of money prepaid to a software rightful claimant from the software user. Further, the predetermined using quantity may be set according to conditions exclusive of the money. For instance, the software may be set as usable only once with no charge in the form of a sample distribution. The software using quantity employed for a determination by the determining unit may be set as a software using time or set, if the software is composed of a plurality of minute modules (or frames), as the number of used minute modules (or frames) or set as the number of uses of the whole software.

The output hindering unit is capable of hindering a normal output to the outside by performing an incomplete output to the outside. On this occasion, if the output to the outside of the apparatus, is an output of a video signal, the output hindering unit may hinder the output to the outside by superimposing other signal on the output of the video signal. In this case, other signal superimposed on the output may be an item of character data indicating that the restricted usable quantity comes to an end or that the restricted usable quantity has been ended to the software user. Further, if the output to the outside of the apparatus is an output of the video signal, the output to the outside of the apparatus may be hindered by inverting a polarity of the video signal. Additionally, if dummy data is previously superimposed on the software, the output hindering unit may be constructed to eliminate the dummy data out of the software only when the determining unit determines that the software using quantity does not reach the predetermined using quantity. Moreover, if the outputs to the outside are plural kinds of outputs so related as to be outputted in synchronism with each other, the output hindering unit may hinder the outputs to the outside by inhibiting some outputs among the plural kinds of outputs. In this instance, the plural kinds of outputs may include outputs of the video signal and of the audio signal. Then, the output hindering unit, when the determining unit determines that the software using quantity reaches the predetermined using quantity, may output the audio signal to the outside and inhibit the output of the audio signal to the outside. Alternatively, the same unit may output the audio signal to the outside and inhibit the output of the audio signal to the outside. Furthermore, only the video signal may be outputted; there may be also outputted the voice signal indicating that the predetermined using quantity is reached and that a further use is not permitted without an approval.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Next, embodiments of the present invention will hereinafter be discussed with reference to the drawings.

Figure 1:
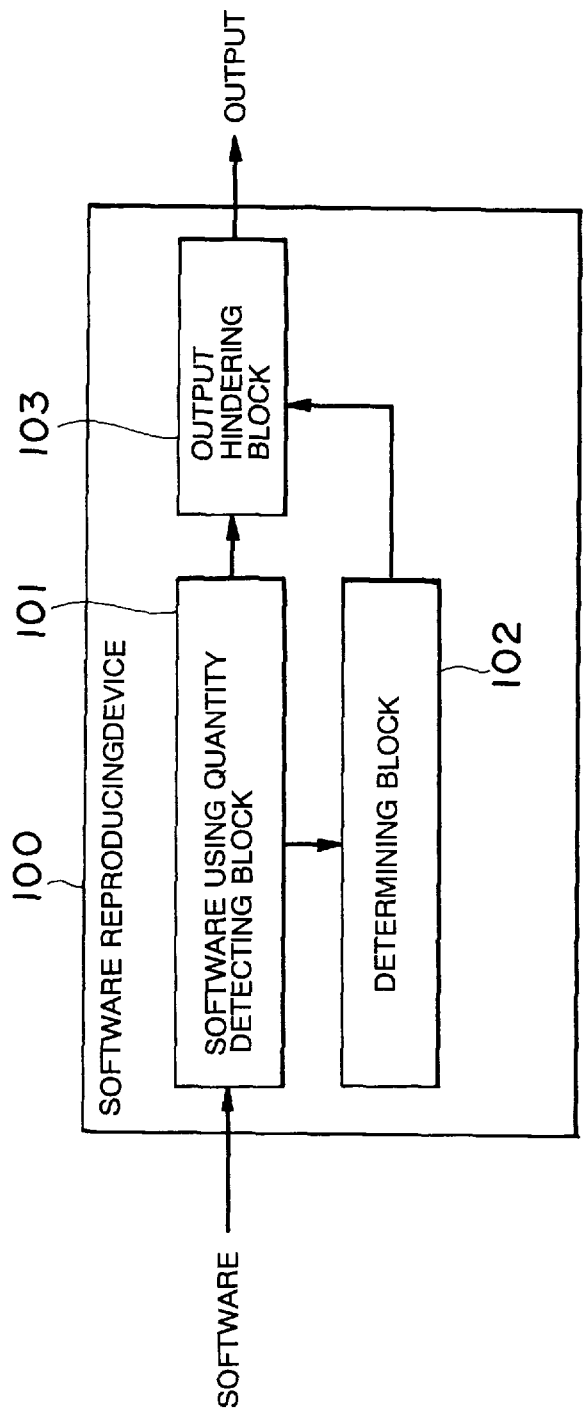
FIG. 1 is a block diagram illustrating a construction common to respective embodiments.

FIG. 1 illustrates a construction common to respective embodiments which follow. A software reproducer 100 includes a software using quantity detecting unit 101, a determining unit 102 and an output hindering unit 103. When the software is inputted to the software reproducer 100 and, a software user uses this software, the software using quantity detecting unit 101 detects a using quantity of this software. The determining unit 102 compares the software using quantity detected by this software using quantity detecting unit 101 with a predetermined available using quantity. The output hindering unit 103, when the determining unit 101 determined that the software using quantity reaches the predetermined available using quantity, hinders an output to the outside.

First Embodiment

<Construction of the Embodiment>

Figure 2:
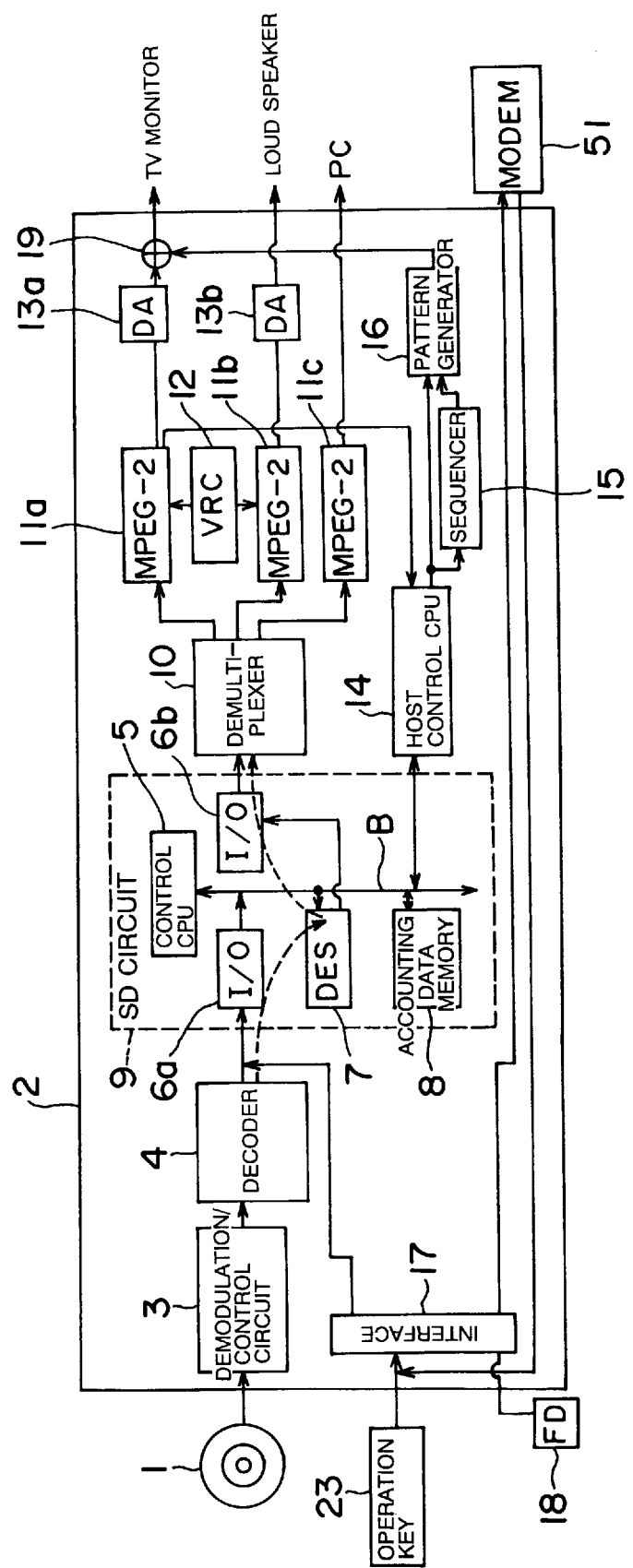
FIG. 2 is a block diagram illustrating a construction of a software reproducer in a first embodiment of the present invention.

FIG. 2 is a block diagram illustrating a construction of a software reproducer employed in a first embodiment of the present invention.

Referring to FIG. 2, a software reproducer 2 is an information device capable of using a variety of software offered through media such as CD-ROM1 and communications via a telephone line. The variety of software take forms of digital data audio such as data, image data, character data and a computer program, etc. Then, contents of the variety of software may be a computer program and data for the program hitherto offered through a floppy disk, a TV program hitherto broadcasted by an analog TV system, a movie program hitherto offered through a video tape and a video disk, music data hitherto offered through radio broadcasting and a compact disk and also still picture data of a photo, etc.

That is, this software reproducer 2 is an information device capable of unitedly dealing with the variety of software offered in the common data format. More specifically, the reproducer 2 incorporates functions to read the multiple software, to execute the computer program, reproduce the movie program, the TV program (reproduce video and audio signals) and the music data (reproduce the audio signal) and also to display the still picture. Note that the video signal and the audio signal are related to each other so that these signals are outputted synchronizing with each other in the movie and TV programs.

Herein, the format of the multiple software stored in the CD-ROM1 will be explained. That is, with respect to the video and audio data, frames are consecutively formed, thus constituting a set of software. Then, the video and audio data frames are A/D converted before being stored in the CD-ROM1. Subsequently, the A/D converted data frames are compressed in conformity with standards of MPEG-2. Herein MPEG-2 .indicates video data compression standards recommended by MPEG (Motion Picture Image Coding Experts Group), wherein the basic video format involves CCIR601 standards (4:2:2 format) and HDVT (up to 1920× 1080 lines/frame). The thus compressed data frames are encrypted by use of a predetermined encryption key. On the other hand, with respect to the computer program, the data are directly encrypted without undergoing the compression processing based on MPEG-2 because of the MPEG standards pertaining to the video and voice signals. The data encrypted (and compressed) through such processing are written to the CD-ROM.

The thus processed data stored in the CD-ROM1 are read by an unillustrated drive unit. The data frames read by this unillustrated drive unit are inputted to a demodulation/control circuit 3 of the software reproducer 2. The demodulation/control circuit 3 incorporates a function to demodulate the inputted data frames and transmit these items of data to a decoder 4.

The decoder 4 executes an error correction and a bit rearrangement and transfers the data frames to an SD circuit 9 at a speed of 2 mega bytes/sec at the maximum (1 mega byte/sec on the average). The decoder 4 is, for transferring the data frames, connected to a system bus B within the SD circuit 9 via an I/O (input/output) unit 6a.

An interface unit 17 is also connected via the I/O unit 6a to the system bus B within this SD circuit 9. This interface unit 17 performs I/O processing between SD circuit 9 and an operation key 23 formed on the external surface of this software reproducer, a floppy disk drive unit 18, and a modem unit 51. Then, the software data transmitted via a communications network from a software vendor are inputted to the SD circuit 9 by this modem unit 51 and the interface unit 17. The software supplied through the communications also has the same format as that of the software supplied by the CD-ROM1 and is encrypted (and compressed) beforehand.

Given next is an explanation of the SD (Super Distribution) circuit 9 connected to the decoder 4 and the interface unit 17. The multiple software supplied to the software reproducer 2 is distributed through an easily available medium as the above-mentioned CD-ROM1 and communications, and, therefore, the problem is how an accounting system is constructed to accounting consideration of an approval for use thereof. The SD circuit 9 is employed for this purpose. That is, the multiple software usable by this software reproducer 2 is distributed in an encrypted status. The variety of encrypted software is sequentially decrypted by the SD circuit 9. Further, the SD circuit 9 subtracts an accounting count value X in synchronism with the use of the software. This accounting count value X is defined as a point written to the SD circuit 9 in accordance with an amount of money prepaid to a software rightful claimant (copyright claimant) by the user. The SD circuit 9 keeps a security of the software by stopping the decoding process when this accounting count value X comes to 0.

Note that this SD circuit 9 is actualized in the form of an IC card which is detachably inserted into a card slot (e.g., a card slot pursuant to PCMCI1) of the software reproducer 2. Since the IC card form is taken, the SD circuit 9 is easy to transport. Accordingly, the user brings it to a software sales shop (software vender) or the like, and the accounting count value X may be added in exchange for a payment of the price.

This SD circuit 9 is constructed of a control CPU 5, a DES (Data Encryption Standard) 7, an accounting data memory 8 and I/O units 6a, 6b, which are mutually connected to the bus B. The control CPU 5 shares with a host control CPU 14 within the software reproducer 2 in terms of control of transferring and receiving the data between the decoder 4, a demultiplexer 10 and the DES 7. Further, a control CPU 5 incorporates a function to control the DES 7 and the accounting data memory 8.

The accounting data memory 8 is a memory for storing the above accounting count value X. Note that the accounting count value X is encrypted within the accounting data memory 8. Hence, it is impossible for persons other than the software rightful claimant to rewrite the accounting count value X by analyzing this accounting data memory 8.

Figure 3:
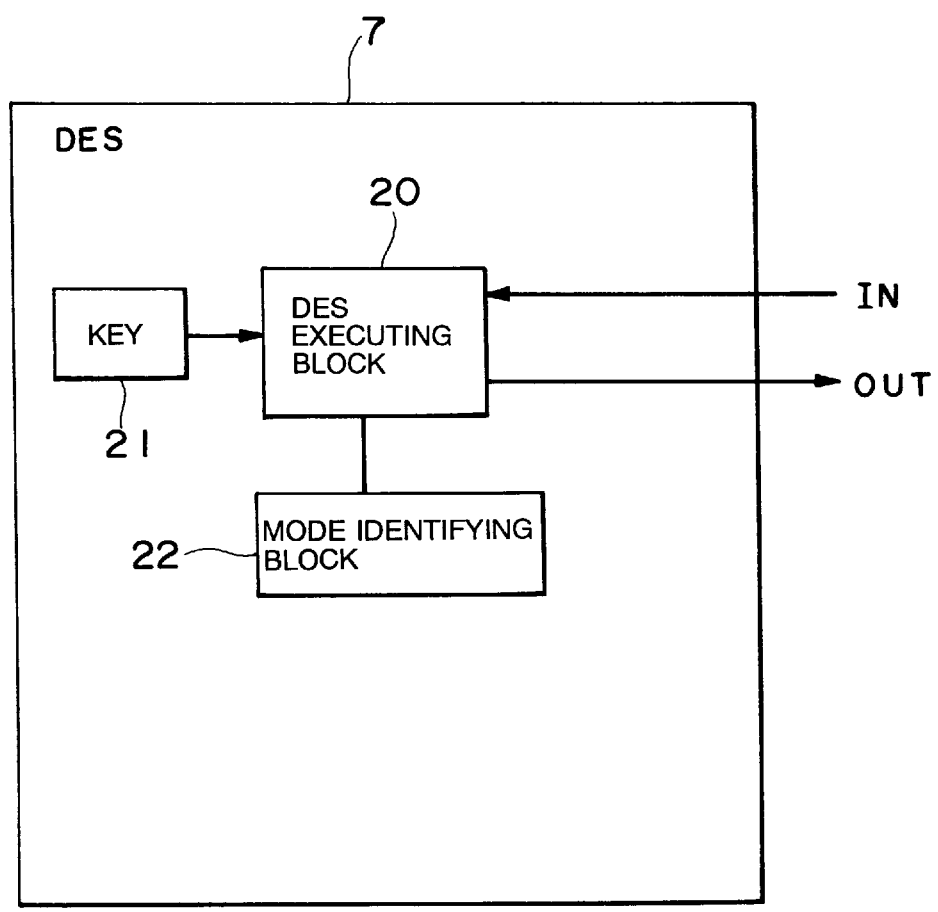
FIG. 3 is a block diagram showing internal functions of a DES of FIG. 2.

The DES 7 has a function to decrypt the video/audio data received from the decoder 4 and a function to encrypt user data (a using time and the number of times of using the software) generated with an operation of the software. Note that the user data is informed to the software vendor via the communications network by the modem 51, or the user data are written to the floppy disk 7 which will be collected by the software vendor when the user paying charges next time. FIG. 3 schematically illustrating a configuration of the DES 7. The DES 7 includes, as shown in FIG. 3, a DES executing unit 20 incorporating a function to decrypt input data (IN) on the basis of key data 21 and output this decrypted result in the form of output data (OUT). In accordance with this embodiment, the DES execution unit 20 has a mode identification unit 22. This mode identification unit 22 has a function to select an optimal mode on the basis of a data format, etc. from a plurality of DES modes and inform the DES execution unit 20 of this selected optimal mode. The key data 21 is a cryptanalysis key informed from the software vendor through the communication when the software vendor has confirmed the receipt of the charge for using the software from the software user. Note that this DES 7 may involve the use of an IC chip (46DATA ENCRYPTION STANDARD NIST) made by Phillips Publication Corp.

Referring back to FIG. 2, the data (video data and audio data, etc.) frames decrypted by the DES 7 are transmitted to the demultiplexer 10 outside the SD circuit 9 via the I/O unit 6b. The demultiplexer 10 demultiplexes the audio data frame, the video data frame, and the computer program and the data for the program. Then, the video data frame is outputted to an MPEG expansion circuit (MPEG-2) 11a, while the audio data frame is outputted to an MPEG expansion circuit (MPEG-2) 11b. Then, the computer program and the data for the program are outputted to an MPEG expansion circuit (MPEG-2) 11c.

The MPEG expansion circuits (MPEG-2) 11a, 11b are circuits for expanding the video or audio data frame transmitted in a compressed status on the basis of the MPEG standard to restore the signal possible of output the image or voice. When the data frames are expanded by these MPEG expansion circuits (MPEG-2) 11a, 11b, a VRC circuit 12 takes synchronism of the outputs of the circuits 11a, 11b. That is, the MPEG expansion circuits (MPEG-2) 11a, 11b output the expanded data frames in synchronism with synchronous signals outputted from the VRC circuit 12. Note that the MPEG expansion circuits 11 may involve the use of an IC chip (ISO/IEC CD 13818'1-3).

The output from the MPEG expansion circuit for video data (MPEG-2) 11a is converted into an analog signal by a D/A converter 13a. This analog signal is outputted to an unillustrated TV monitor unit connected to the software reproducer 2 via an adder circuit 19. Further, the output from the MPEG expansion circuit for audio data (MPEG-2) lib is converted into an analog signal by a D/A converter 13b. This analog signal is outputted directly to an unillustrated loud speaker connected to the software reproducer 2. On the other hand, the computer oriented program and data for the program directly passes through the MPEG expansion circuit (MPEG-2) 11c and is outputted to an unillustrated personal computer connected to the software reproducer 2.

The MPEG expansion circuit for video data(MPEG-2) 11a outputs a completion-of-frame-expansion signal each time an expanding process of the individual compressed data frame is completed. This completion-of-frame-expansion signal is received by the host control CPU 14 of the software reproducer 2 and then used for controlling the accounting. That is, the host control CPU 14 when receiving this completion-of-frame-expansion signal cooperates with a control CPU 5 which is provided in the SD circuit and connected to the CPU 14 via the bus in subtracting the accounting count value X shown in an accounting data memory 8. The host control CPU 14 controls an output hindrance when the accounting count value X is 0. Note that the host control CPU 14 is a processor for controlling the software reproducer 2 as a whole, as well as the accounting.

Figure 4:
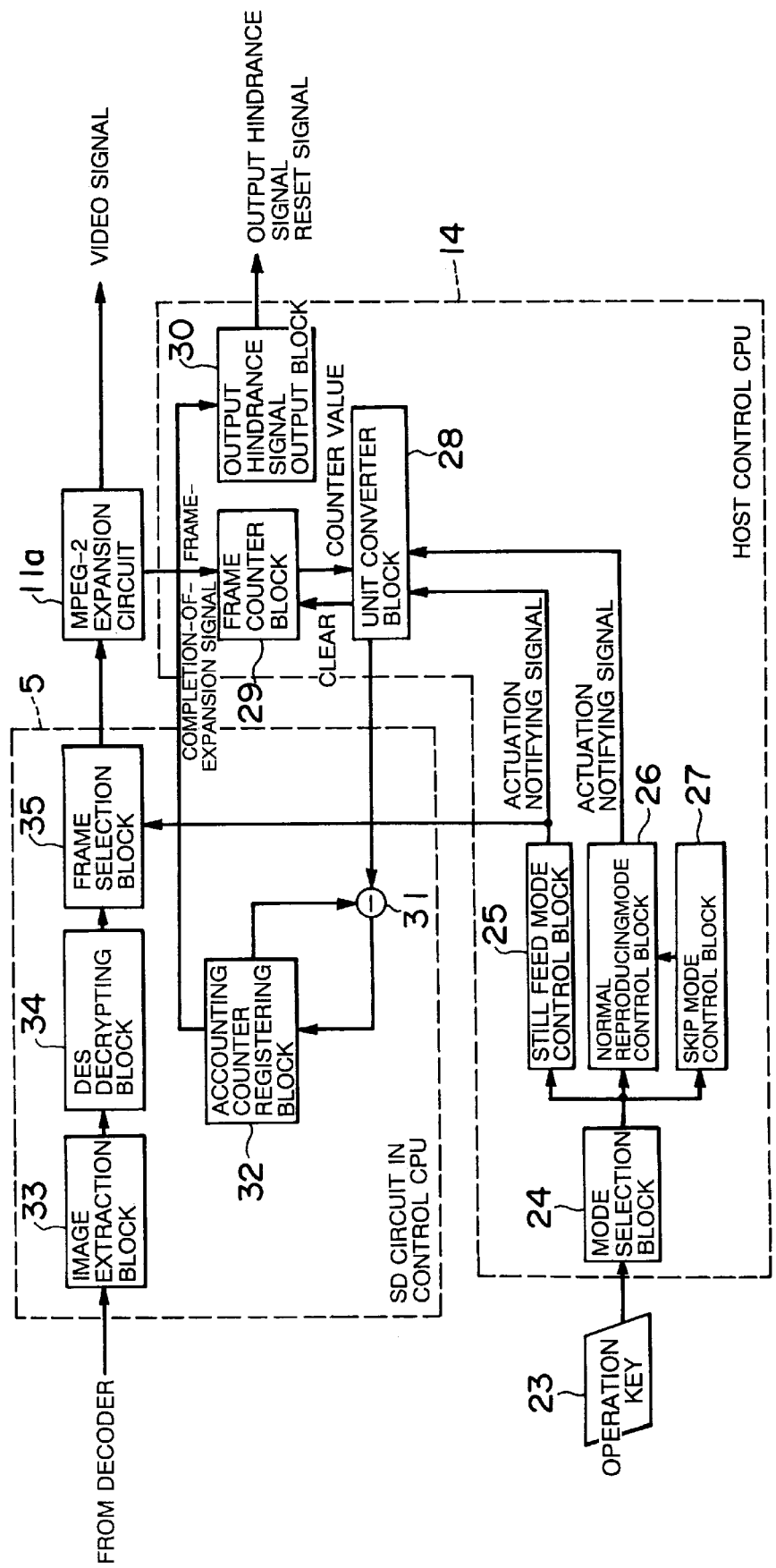
FIG. 4 is a block diagram showing functions of control CPUs 5 and 14 of FIG. 2.
Figure 5:
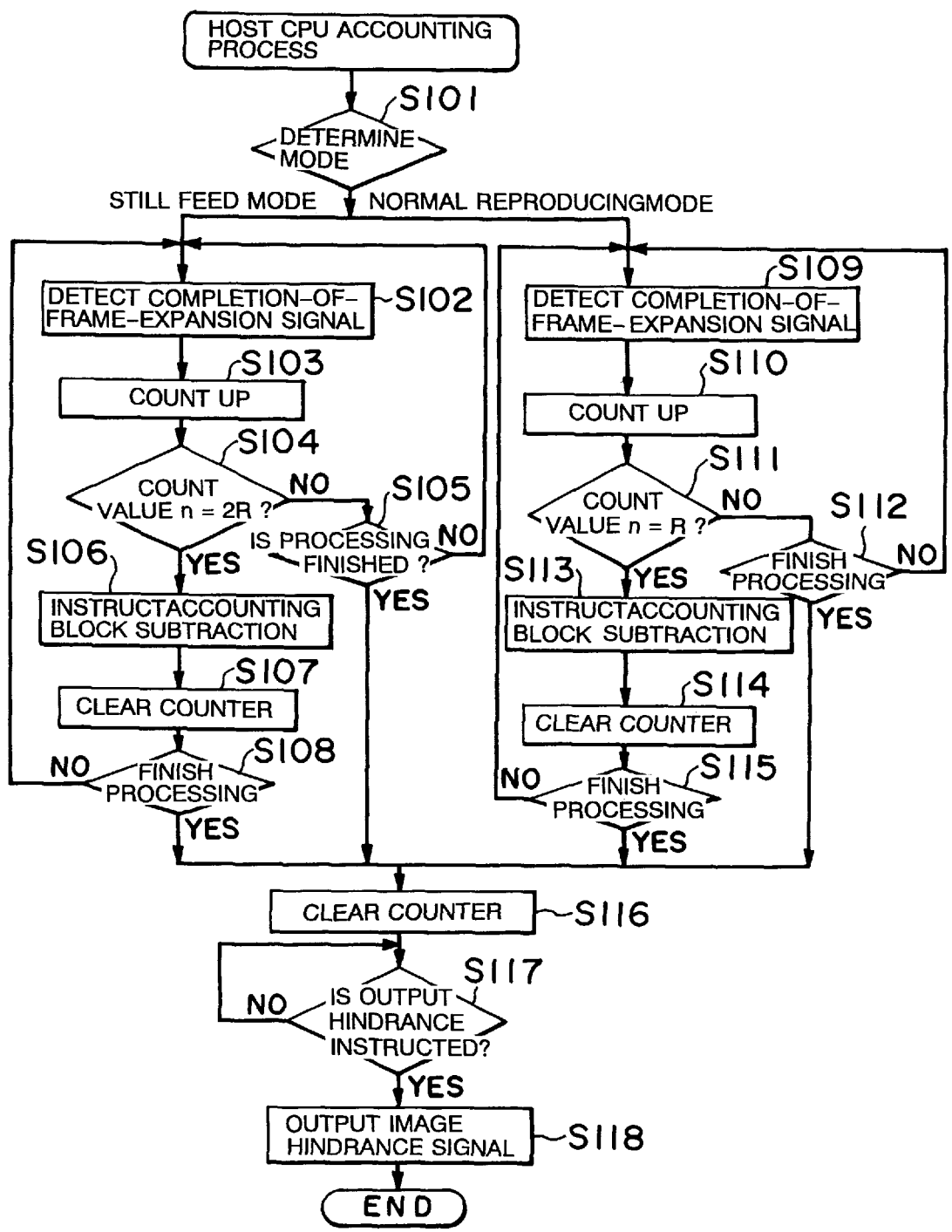
FIG. 5 is a flowchart showing the processing executed by the control CPU 14 of FIG. 2.

The following is a detailed discussion on specific contents of the accounting process executed by this host control CPU 5 and the control CPU 5 within the SD circuit 9 with reference to FIGS. 4 and 5.

FIG. 4 is a diagram illustrating blocked functions of these two control CPUs 14 and 5. Referring to FIG. 4, the host control CPU 14 is constructed of a frame counter block 29 for receiving the completion-of-frame-expansion signal transmitted from the MPEG expansion circuit 11a and a mode selection block 24 for receiving an input (via the interface 17, the I/O unit 6a and the bus B) from an operation key 23 provided on the external surface of the software reproducer 2. The host control CPU 14 is also constructed of a skip mode control block 27 for receiving a signal from this mode selection block 24, a normal reproducing mode control block 26 for receiving signals from the mode selection block 24 and the skip mode control block 27 and a still feed mode control block 25 for receiving a signal from the mode selection block 24. The host control CPU is further constructed of a block converter 28 for receiving signals from the ordinary reproducing mode control block 26, the still feed mode control block 25 and the frame counter block 29 and an output hindrance signal output block 30 for receiving a signal from the control CPU 5 of the SD circuit 9. On the other hand, the control CPU 5 of the SD circuit 9 is constructed of an image extraction block 33 for receiving a signal from the decoder 4, a DES decrypting block 34 for receiving a signal from the image extraction block 33 and a frame selection block 35 for receiving signals from the still feed mode control block 25 as well as from the DES decrypting block 34 and outputting the signals to the MPEG expansion circuit 11a. The control CPU 5 is also constructed of a subtracter block 31 for receiving a signal from the unit converter block 28 and an accounting counter registering block 32 for receiving a signal from the subtracter block 31 and outputting the signals to the output hindrance signal output block 30 and the subtracter block 31. The above functional blocks will hereinafter be described.

The mode selection block 24 detects that there is depressed one of a "regenerative key", a "still feed key" and a "skip feed key" that constitute the operation keys 23. The mode selection block 24 then starts up one of the skip mode control block 27, the normal reproducing mode control block 26 and the still feed mode control block 25 in accordance with the depressed key. Note that these respective control blocks 25, 26, 27 are stopped upon depressing a "stop key" partly constituting the operation keys 23. The normal reproducing mode control block 26 performs the control of outputting all the frames transmitted to the SD circuit 9 at a predetermined interval in sequence. When the normal reproducing mode control block 26 is started up, a start-up notifying signal is inputted to the block converter block 28 for a duration of the actuation of the control block 26. The skip mode control block 27 performs the control to intermittently actuate the normal reproducing mode control block 26. The still feed mode control block 25 effects the control to select and output the frame transmitted to the SD circuit 9 in accordance with a predetermined algorithm. In the still feed mode, the video data are displayed by way of a fast motion picture of shipped frames (step search). When starting up the still feed mode control block 25, an actuation notifying signal is transmitted to the block converter 28 and the frame selection block 35 for a duration of the actuation of the control unit 25.

On the other hand, when actuating the normal reproducing mode control block 26 or the still feed mode control block 25, an unillustrated CD-ROM drive, a demodulation/control circuit 3 and the decoder 4 are started up (alternatively, the data frame is down-loaded through a modem 51), thereby transmitting the data frame to the image extraction block 33. The image extraction block 33 extracts only the video data frame from the transmitted data frames and transfers the extracted data frame to the DES decrypting block 34.

This DES decrypting block 34 actuates the DES 7 and decrypts the transferred video data frame. The video data frame decrypted by the DES decrypting block 34 is inputted to the frame selection block 35.

The frame selection block 35, for a duration of receiving the actuation notifying signal from the still feed mode control block 25, selects some of the received video data frames in accordance with the predetermined algorithm and output them to the MPEG expansion circuit 11a. As an algorithm for this video data frame selection, there are selectively used, for example, algorithms of selecting only a frame in which a predetermined flag is set, selecting one frame at an interval of a predetermined number of frames and selecting one frame at a predetermined time interval. Note that the frame selection block 35 outputs all the video data frame s received to the MPEG expansion circuit 11a for a duration of receiving no actuation notifying signal from the still feed mode control block 25.

The MPEG expansion circuit for video data 11a receiving the video data frame effects an expanding process on the received video data frames one by one. The MPEG expansion circuit 11a, each time the circuit 11a completes the expanding process on the individual frame, outputs the video signal to the D/A converter 13a and transmits the completion-of-frame-expansion signal to the frame counter block 29.

The frame counter block 29 is a counter for counting up a count value n by 1 each time the block 29 receives the completion-of-frame-expansion signal. The frame counter block 29 notifies the block converter 28 of this count value n at all times. Further, the frame counter block 29, when receiving a clear signal from the unit converter block 28, clears the count value n to 0.

The unit converter block 28 compares the count value n of which the frame counter block 29 informs with a predetermined reference value for a duration of receiving the actuation notifying signal from the normal reproducing mode control block 26 or the still feed mode control block 25. This predetermined reference value is set to R (e.g., R=100,000,000) when receiving the actuation notifying signal from the normal reproducing mode control block 26 but to 2R when receiving the actuation notifying signal from the still feed mode control block 25. Then, the unit converter block 28, when the count value n reaches the predetermined reference value, outputs an accounting unit subtraction instruction to the subtracter block 31. More specifically, the unit converter block 28 outputs a substraction value "1" to the subtracter block 31. Note that the unit converter block 28, when stopping the actuation notifying signal stopped or when outputting the accounting block substraction instruction, outputs the clear signal to the frame counter block 29. A software using quantity detecting device is constructed of the MPEG expansion circuit for video signal 11a, the frame counter block 29 and the unit converter block 28.

The accounting counter registering block 32 reads the accounting count value X from the accounting data memory 8 and notifies the subtracter block 31 of this value. The accounting counter registering block 32, at the same time, updates the accounting count value X of the accounting data memory 8.

The subtracter block 31, when the accounting block substraction instruction is given from the unit converter block 28, decrements the accounting count value X by 1, of which the accounting counter registering block 32 notifies. Subsequently, the subtracter block 31 notifies the accounting counter registering block 32 of this new decremented accounting count value X (X=X-1). The accounting counter registering block 32 overwrites the new accounting count value X (X=X-1) of which the subtracter block 31 notifies on the accounting data memory 8.

The accounting counter registering block 32 determined whether or not the accounting count value X written in the accounting data memory 8 becomes 0 (unusable value). Then, when the accounting count value X comes to 0, the accounting counter registering block 32 notifies the output hindrance signal output block 30 of this effect. Note that the accounting counter block 32, if the accounting count value X in the accounting data memory 8 is rewritten from "0" to "1" or greater by the software vendor, notifies the output hindrance signal output block 30 of this effect. The subtracter block 31 and the accounting counter registering block 32 are combined to constitute a determining device. The output hindrance signal output block 30, when receiving a notice that the accounting count value X=0 from the accounting counter registering block 32, outputs a video hindrance signal. Further, the video hindrance signal output block 30, when receiving a notice that the accounting count value X>0 from the accounting counter registering block 32, outputs a reset signal.

A flow of processing executed by the respective control CPUs 5, 14 described above will be explained with reference to flowcharts of FIGS. 5 and 6.

FIG. 5 is the flowchart showing a flow of the accounting process executed by the host control CPU 14 of the software reproducer 2. This process starts with detecting that one of the "reproducing key", the "still feed key" and the "skip feed key" constituting the operation keys 23 is depressed. In initial step S101, the host control CPU 14 determines an image display mode to be executed based on a type of the depressed key. That is, when the "reproducing key" or the "skip feed key" depressed, the host control CPU 14 determines it as a "normal reproducing mode". To the contrarily, when the "still feed key" depressed, the host control CPU 14 determines it as a "still feed mode". The processes subsequent thereto are different depending on the reproducing modes determined.

In the case of the "still feed mode", the completion-of-frame-expansion signal from the MPEG expansion circuit 11a is detected in step S102. When detecting the completion-of-frame-expansion signal, the processing proceeds to step S103, wherein the count value n of the frame counter unit 29 is counted up by 1.

In subsequent step S104, the CPU 14 determines whether or not the count value n reaches a reference value 2R ( e.g., 2R=200,000,000). Then, if the count value n does not reach the reference value 2R, in step S105, the CPU 14 determines whether the accounting process is finished or not. This determination is performed based on whether or not the actuation notifying signal is received from the still feed mode control mode 25. That is, if the actuation notifying signal is not received, the processing proceeds to step S116 by determining that the accounting process is to be finished.

Whereas if the actuation notifying signal is received, the processing goes back to step S102 by determining that the accounting process is to be continued.

On the other hand, when determining that the count value n reaches the reference value 2R in step S104, the processing proceeds to step S106. In step S106, the accounting block substraction instruction is given to the control CPU 5 of the SD circuit 9.

In subsequent step S107, the count value n of the frame counter block 29 is cleared to 0.

In subsequent step S108, as in the same way with step S105, the CPU 14 determines whether or not the accounting control process is finished. Then, when determining that the accounting control process continues, the processing is returned to step S102. Contrastingly when determining that the accounting control process is to be finished, the processing proceeds to step S116.

Contrastingly in the case of the "normal reproducing mode" the completion-of-frame-expansion signal from the MPEG expansion circuit 11a is detected in step 109. When detecting the completion-of-frame-expansion signal, the processing proceeds to block S110, wherein the count value n of the frame counter block 29 is counted up by 1.

In subsequent step S111, the CPU 14 determines whether or not the count value n reaches a reference value R ( e.g., R=100,000,000). Then, if the count value n does not yet reach the reference value R, in step S112, the CPU 14 determines whether the accounting process is finished or not. This determination is effected based on whether or not the actuation notifying signal is received from the normal reproducing mode control block 26. That is, if the actuation notifying signal is not received, the processing proceeds to step S116 by determining that the accounting process is to be finished. Whereas if the actuation notifying signal is received, the processing goes back to step S109 by determining that the accounting process is to be continued.

On the other hand, when determining that the count value n reaches the reference value R in step S111, the processing proceeds to step S113. In step S113, the accounting block substraction instruction is given to the control CPU 5 of the SD circuit 9.

In subsequent step S114, the count value n of the frame counter block 29 is cleared to "0".

In subsequent step S115, as in the same way with step S112, the CPU 14 determines whether or not the accounting control process is finished. Then, when determining that the accounting control process continues, the processing is returned to step S109. Contrastingly when determining that the accounting control process is to be finished, the processing proceeds to step S116.

In any case, in step S116, the count value n of the frame counter block 29 is cleared to "0".

Subsequently, the CPU 14 waits for the output hindrance instruction given from the control CPU 5 of the SD circuit 9 in step S117. Then, when the output hindrance instruction is given therefrom, the video hindrance signal is outputted in step S118. After the above, this accounting process is finished.

Figure 6:
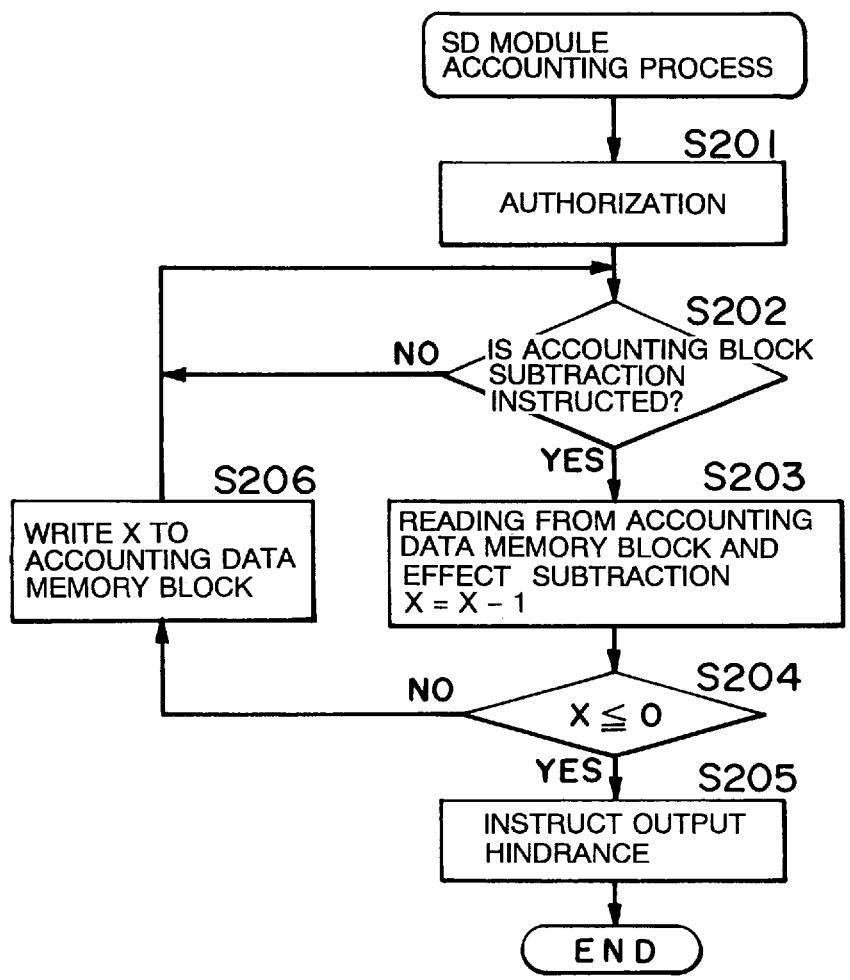
FIG. 6 is a flowchart showing the processing executed by the control CPU 5 of FIG. 2.

FIG. 6 is a flowchart showing a flow of accounting process executed by the control CPU 5 of the SD circuit 9.

This process starts when the IC card incorporating the SD circuit 9 is set in the software reproducer 2. Then, in initial step S201, the control CPU 5 executes authorization. This authorization implies checking the control CPUs 14, 5 each other when setting the SD circuit 9.

Subsequently, the control CPU 5 checks whether or not the accounting block subtraction instruction is received from the host control CPU 14 in step S202. Then, when receiving no accounting block subtraction instruction, the check in this step S202 is repeated.

Whereas if the accounting unit subtraction instruction is received, in step S203, the accounting count value X is read from the accounting data memory 8. Subsequently, "1" is subtracted from this accounting count value X, and read subtracted value (X–1) is set as a new accounting count value X.

In subsequent step S204, the CPU 5 determines whether the new accounting count value X is 0 or under. Then, if the new accounting count value X is more than 0, the processing proceeds to step S206. In step S206, the new accounting count value X is written to accounting data memory 8. Next, the processing is returned to step S202.

Whereas if the accounting count value X is 0 or under, in step S205, the output hindrance instruction is given to the host control CPU 14. Thereafter, this processing is ended.

Note that a reexecution of the processing shown in FIG. 6 entails such an operation that the SD circuit 9 is temporarily demounted from the software reproducer 2, the software vendor writes the accounting count value in the accounting data memory 8 in exchange for a payment of the charge for using the software, and the SD circuit 9 has to be installed again in the software reproducer 2.

Referring back to FIG. 2, there will be explained a configuration of the output hindrance device for effecting incomplete outputting by superimposing image patterns on the video signal displayed on the TV monitor in accordance with the output hindrance signal given from the host control CPU 14.

The output hindrance signal from the host control CPU 14 is inputted to a pattern generator 16 and a sequencer 15. This sequencer 15 outputs a signal switched ON/OFF in a predetermined sequence from a timing at which the video hindrance signal is received. That is, as illustrated in FIG. 7(c), the sequencer 15 switches OFF the output before receiving the video hindrance signal but switches ON/OFF the output several times after receiving the video hindrance signal. Thereafter, the sequencer 15 continues the output ON. The output signal of this sequencer 15 is inputted to the pattern generator 16.

Th e pattern generator 16, when receiving the output hindrance signal, generates image pattern data for displaying the character data to induce an attention with the software user as "Accounting Count value=0" for example. The pattern generator 16 output s the thus generated image pattern data only when the output signal of the sequencer 15 is turned ON. The image pattern data outputted from this pattern generator 16 is inputted to the adder circuit 19.

The adder circuit 19 superimposes the image pattern signal outputted from the pattern generator 16 on an analog video signal outputted from the D/A converter for video signal 13a and outputs the superimposed signals to the TV monitor unit. Accordingly, when the image pattern signal transmitted from the pattern generator 16 is switched OFF, the analog video signal outputted from the D/A converter 13a is outputted as it is. Whereas if the image pattern signal is switched ON, there is outputted such a video signal in which the image pattern is superimposed on the analog video signal outputted from the D/A converter 13a. Note that this adder circuit 19 is provided only on the output side of the video oriented D/A converter 13a. Accordingly, even when the host control CPU 14 outputs the output hindrance signal, the analog audio signal, the computer program and the data for the program (hereinafter termed as a "PC signal") are normally outputted as before.

Note that the sequencer 15 and the pattern generator 16 stop outputting when a reset signal is transmitted from the host control CPU 14.

<Operation of the Embodiment>

Now, it is assumed that the "reproducing key" partly constituting the operation keys 23 is depressed. Then, the audio and video data frames related each other so that these frames are outputted in synchronism with each other are transmitted to the SD circuit 9 from the CD-ROM1. These audio and video data frames are decrypted by the DES 7.

The SD circuit 9 inputs all the decrypted audio and video data frames in sequence to the demultiplexer 10. The video data frame demultiplexed by the demultiplexer 10 is inputted to the MPEG expansion circuit for video data 11a, while the audio data frame is inputted to the MPEG expansion circuit for video data 11b. Each of the MPEG expansion circuits 11a, 11b expands the received frames one by one in sequence and outputs the expanded frames to the D/A converters 13a, 13b.

Each time the MPEG expansion circuit for video data 11a completely expands the individual video data frame, the completion-of-frame-expansion signal is inputted to the host control CPU 14. This host control CPU 14 counts up the number of receiving the completion-of-frame-expansion signals and makes the CPU 5 in the SD circuit 9 decrement the accounting count value X in the accounting data memory 8 each time this count value n reaches the predetermined reference value R.

Thus, in accordance with this embodiment, a charge is imposed corresponding to the number of outputted frames even if the user watches any section of a moving picture or even if the user repeatedly watches the same section of a moving picture (e.g., movie). Further, if the picture is stopped, a new frame is not outputted, and, therefore no charge is imposed. Accordingly, no irrational situation is produced as seen in the conventional accounting method, and a proper charge is imposed. As a result, there is no necessity for adding uncollectible charges for use to the charge for one use beforehand, and hence the charges for use can be set to a comparatively low amount of money.

Note that when depressing the "still feed key" partly constituting the operation keys 23, the SD circuit 9 outputs, to the demultiplexer 10, only the video data frames selected in a skipping manner on the basis of the predetermined algorithm and the audio data frames corresponding thereto.

The video data frames demultiplexed by the demultiplexer 10 are inputted to the MPEG expansion circuit for video data 11a, while the audio data frames are inputted to the MPEG expansion circuit 11b for video data. When the MPEG expansion circuit for video data 11a completes the expansion processing on the individual video data frame, the completion-of-frame-expansion signal is inputted to the host control CPU 14. In this case, however, the host control CPU 14 does not make the CPUC 5 in the SD circuit 9 decrement the accounting count value X in the accounting data memory unit till the count value n of the number of receiving the completion-of-frame-expansion signals reaches a value that is twice the reference value R. That is, the accounting count value X is decremented every time the count value n reaches 2R.

Accordingly, even when the same number of frames are outputted within the same period of time, the charge imposed in the step mode is generally a half of the charge imposed at the normal reproducing mode. Hence, a partiality to the case of the normal reproducing is generally obviated, and, on the other hand, a charge for outputting the data can be also imposed. Consequently, an impartial profit adjustment can be made between the software rightful claimant and the user.

Figure 7:
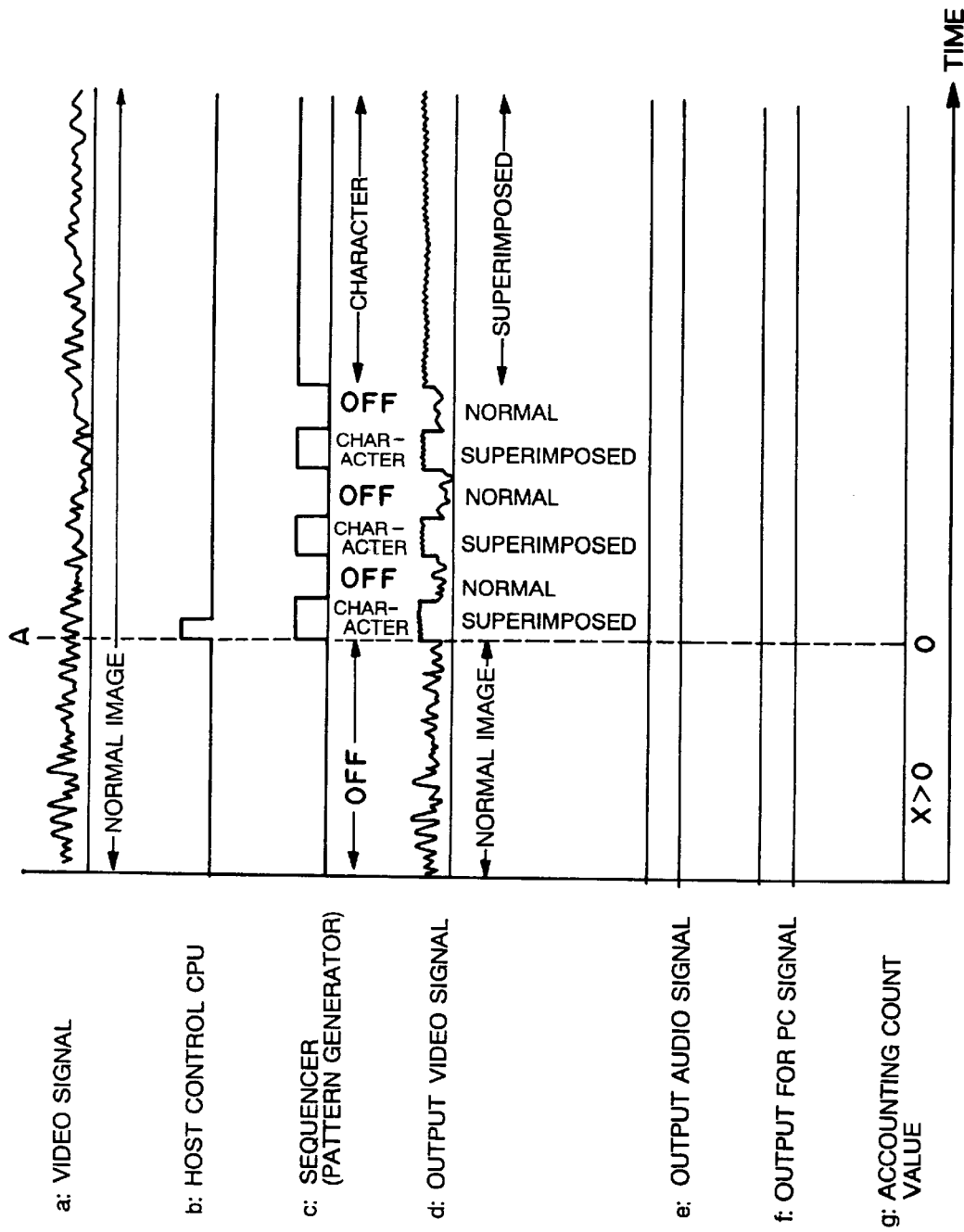
FIG. 7 is a time chart showing signal statuses in respective units of FIG. 2.

As a result of decrementing the accounting count value X in this way, the accounting count value X becomes 0. In this case, a signal status in each unit goes as illustrated in FIG. 7. Referring to FIG. 7(g), there is shown that the accounting count value X becomes 0 at a timing "A".

To start with, since the DES 7 decrypts the data even after the accounting count value X has become 0, the A/D converter for video data 13a continues to output the normal analog video signal after the timing "A" (see FIG. (7a)).

Next, the host control CPU 14, when the accounting count value X comes to 0 at the timing "A", outputs the pulse-like output hindrance signal (see FIG. 7(b)).

Hereupon, the sequencer 15 outputs the signal repeatedly switched over alternately in ON/OFF statuses within a fixed period of time since the output hindrance signal is received and, after this fixed period of time has elapsed, continuously outputs the signal kept in the ON status (see FIG. 7(c)).

The pattern generator 16 receives the output hindrance signal (b) and the output signal of the sequencer 15 and thereby outputs the character pattern data (video signal for indicating a character "Accounting Count value =0]" only at a timing when the output signal of this sequencer 15 is switched ON. Hence, a timing at which the pattern generator 16 outputs the character pattern data is as shown in FIG. 7(c).

The adder circuit 19 for superimposing the video signal (a) and the character pattern data (c) outputs the normal video signal (a) as far as an accounting count value X(g) is larger than 0. Then, during a fixed period from the timing "A" when the accounting count value X(g) becomes 0, the output for superimposing the character pattern on the image and the normal image output are repeatedly alternately given forth. Then, after this fixed period has elapsed, the output for superimposing the character pattern on the image is continuously given forth (see FIG. 7(d)).

Note that an audio signal (e) and a PC signal (f) continue to be outputted normally before and after the timing "A".

Accordingly, after the timing "A" when the accounting count value comes to 0, there is effected such an output hindrance as to superimpose the character pattern with respect to only the image signal among the three outputs (image signal, voice signal and PC signal). Therefore, the software user watching the unillustrated TV monitor does not misunderstand an occurrence of a failure in the apparatus but is able to recognize that the accounting count value becomes 0. At this time, the audio signal and the PC signal are normally given forth as they are. If the software is based mainly on the picture (e.g., movie, animation, etc.), however, a profit of the software rightful claimant is not infringed. This rather, it can be considered, produces an effect of enhancing a desire for the continuous use by the software user. As a result, the software user is prompted to pay the charge for use to the software vendor as a compensation for adding the accounting count value X by removing the SD circuit 9 out of the software reproducer 2.

Second Embodiment

<Construction of the Embodiment>

Figure 8:
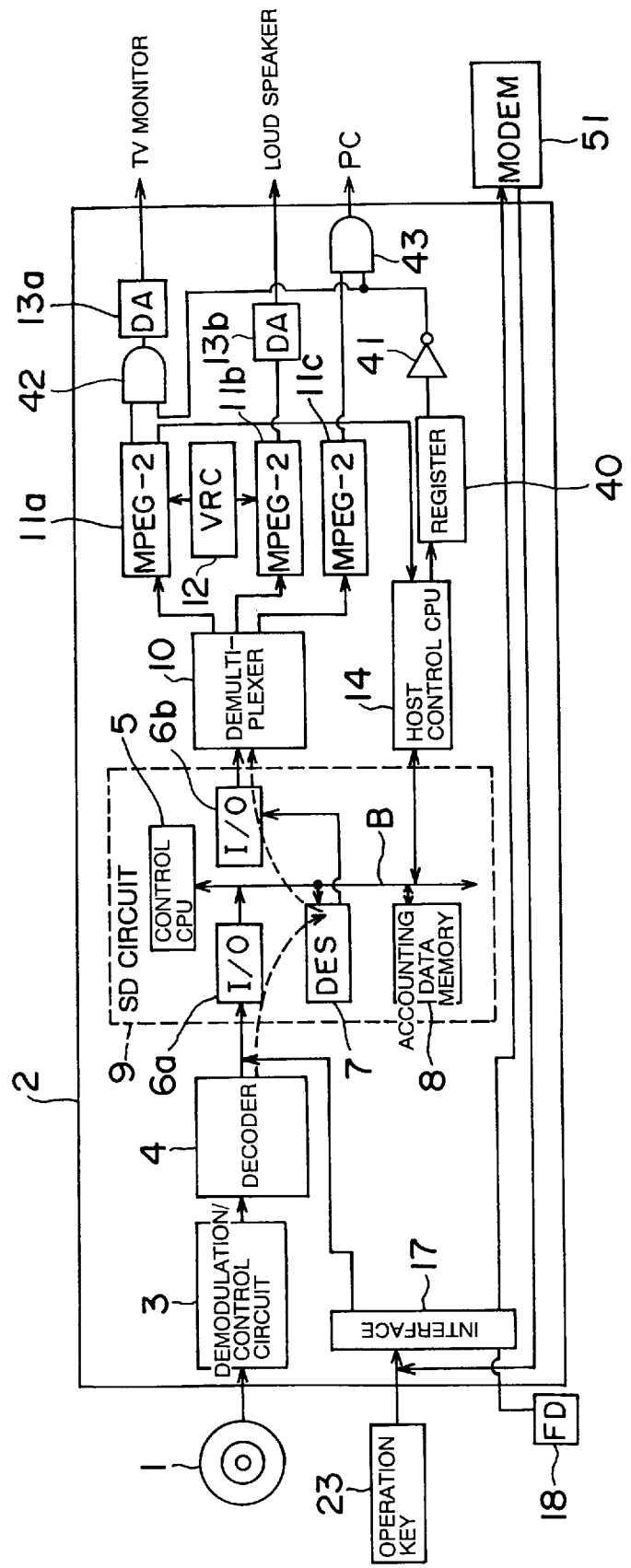
FIG. 8 is a block diagram illustrating a construction of the software reproducer in a second embodiment of the present invention.

FIG. 8 is a block diagram illustrating a construction of the software reproducer employed in a second embodiment of the present invention.

This embodiment, as in the same way with the first embodiment, takes such a construction of counting the number of operations of expanding the video data frame compressed based on the MPEG standards and reducing the accounting count value X in accordance with the number of operations thereof. Further, the output hindrance when the accounting count value X becomes 0 involves the use of such a construction as to completely stop the image signal and the PC signal while continuing to output the normal audio signal.

A format of the software supplied to the software reproducer 2 in this embodiment is absolutely the same as that in the first embodiment. Further, the same components of the software reproducer 2 in this embodiment as those in the first embodiment are marked with the numerals identical with those in the first embodiment. Hereinbelow, the explanation of these common elements will be omitted, but there is explained only a configuration of a device for hindering the output in accordance with the output hindrance signal transmitted from the host control CPU 14.

The output hindrance signal from the host control CPU 14 is inputted to a register 40. This register 40 outputs a logic value L in an initial status but, when detecting a rise of the inputted output hindrance signal, continues to output a logic value H thereafter.

An output signal of this register 40 is inverted by an inverter 41. Hence, the inverter 41 outputs the logic value H in the initial status but, after outputting the output hindrance signal, continues to output the logic value L.

An output of this inverter 41 is supplied to an input terminal of an AND circuit for video data 42. The other input terminal of this AND circuit for video data 42 is connected to an output terminal of the MPEG expansion circuit for video data (MPEG-2) 11*a*. Accordingly, this AND circuit for video data 42 serves as a gate for the video signal to be inputted to the D/A converter for video data 13*a* from the MPEG expansion circuit for video data 11*a*. For this reason, a passage of the video signal is permitted only when the output signal of the inverter 41 takes the logic value H, and, therefore, the analog video signal is outputted from the D/A converter for video data 13*a* to an unillustrated TV monitor device. Also, when the output of the inverter 41 takes the logic value L, the passage of this video signal is inhibited, and hence no analog video signal is outputted from the D/A converter for video data 13*a*.

The output of the inverter 41 is supplied to also an input terminal of an AND circuit for PC signal 43. The other input terminal of the AND circuit for PC signal 43 is connected to an output terminal of the MPEG expansion circuit for PC signal (MPEG-2) 11*c*. Accordingly, this AND circuit for PC signal 43 serving as a gate for the PC signal permits a passage of this PC signal only when the output of the inverter 41 takes the logic value H but inhibits the passage of the PC signal when the output of the inverter 41 takes the logic value L.

Note that the AND circuit serving as the gate is not provided on the output terminal of the MPEG expansion circuit for audio data 11*b*. Hence, even when the output hindrance signal is outputted from the host control CPU 14, the analog audio signal from the D/A converter for audio data 13*b* is normally outputted as before.

Incidentally, when the reset signal is transmitted from the host control CPU 14, the register 40 outputs logic value L.

<Operation of the Embodiment>

The software reproducer 2 in this embodiment operates in the same way with the first embodiment till the host control CPU 14 outputs the output hindrance signal. Accordingly, there will hereinafter be explained only the operation after the host control CPU 14 has outputted the output hindrance signal.

Figure 9:
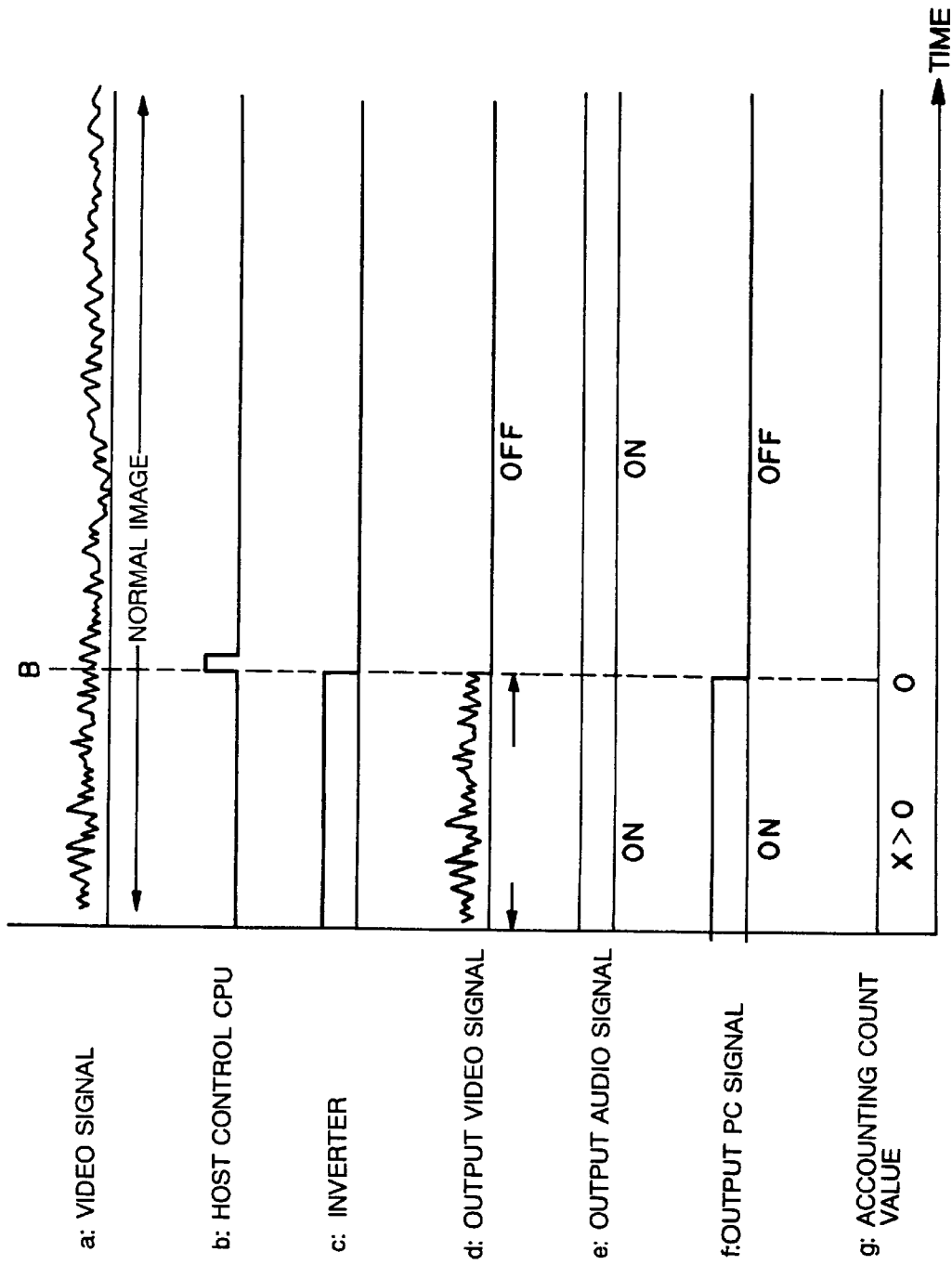
FIG. 9 is a time chart showing signal statuses in the respective units of FIG. 8.

If the accounting count value X stored in the accounting data memory 8 becomes 0 as a result of the decrement, the signal status in each unit goes as illustrated in FIG. 9. FIG. 9 shows that the accounting count value X comes to 0 at a timing "B" (see FIG. 9(*b*)).

The DES 7 decrypts the data even after the accounting count value X has become 0, and, therefore, the normal video signal continues to be outputted from the MPEG expansion circuit for video data 11*a* after the timing "B" (see FIG. 9(*a*)).

The host control CPU 14, when the accounting count value X comes to 0 at the timing "B", outputs the pulse-like output hindrance signal (see FIG. 9(*b*)).

The register 40 which outputted the logic value L before the timing "B" outputs the logic value H after the timing "B", synchronizing with a rise of the received output hindrance signal.

Accordingly, the inverter 41 for receiving the output of this register 40 outputs the logic value H before the timing "B" but outputs the logic value L after the timing "B" (see FIG. 9(*c*)).

The AND circuit for video data 42 for permitting or inhibiting the passage of the image signal in accordance with the output signal of this inverter 41 outputs a normal video signal (a) before such the timing "B" when an accounting count value X(g) is larger than 0. Then, the AND circuit 42 inhibits the output of the video signal after the timing "B" when the accounting count value X(g) becomes 0 (see FIG. 9(*d*)).

Similarly, the AND circuit for PC signal 43 for permitting or inhibiting a passage of the PC signal in accordance with the output signal of the inverter 41 outputs the PC signal to the outside of the device 2 before the timing "B" when the accounting count value X(g) is larger than 0 but inhibits the output of the PC signal to the outside of the device 2 after the timing "B" when the accounting count value X(g) becomes 0 (see FIG. 9(*f*)).

Note that the audio signal continues to be normally outputted before and after the timing "B" (see FIG. 9(*e*)).

Accordingly, after the timing "B" when the accounting count value becomes 0, there is effected such an output hindrance as to inhibit the output to the outside of the software reproducer 2 with respect to only the image signal and the PC signal among the three outputs (image signal, voice signal and PC signal). At this time, however, the audio signal remains to be normally given forth. Therefore, the software user is capable of recognizing that the accounting count value X becomes 0 without such a misconception that a trouble happens in the device 2.

As described above, in accordance with this embodiment, the PC signal is inhibited from being given forth to the outside of the software reproducer 2, and it is therefore possible to prevent an illegal use of the computer program. Note that the audio signal continues to be normally outputted, but, the profit of the software rightful claimant is not infringed if the software is based on the picture (e.g., movie, environmental video, etc.). This rather, it can be considered, produces an effect of enhancing a desire for the continuous use by the software user. As a result, the software user is prompted to pay the charge for use to the software rightful claimant as a compensation for adding the accounting count value X by removing the SD circuit 9 out of the software reproducer 2.

Third Embodiment

<Construction of the Embodiment>

Figure 10:
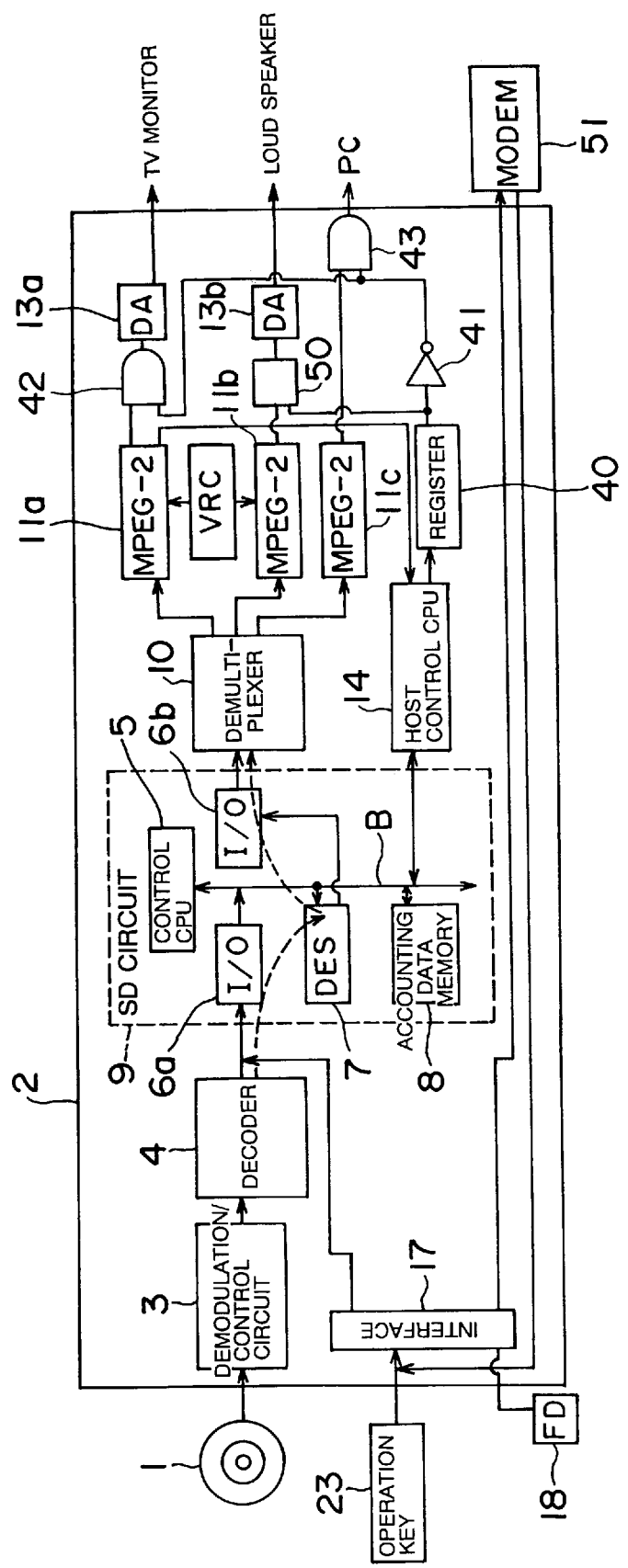
FIG. 10 is a block diagram illustrating a construction of the software reproducer in a third embodiment of the present invention.

FIG. 10 is a block diagram illustrating a construction of the software reproducer employed in a third embodiment of the present invention.

Only a difference between this embodiment and the second embodiment is that an audio signal hindrance circuit 50 inputting the signal outputted from the register 40 is connected between the MPEG expansion circuit for audio data 11b and the D/A converter for audio data 13b. Accordingly, there will be herein explained only added configurations as compared with the second embodiment, but other explanations will be omitted.

Figure 11:
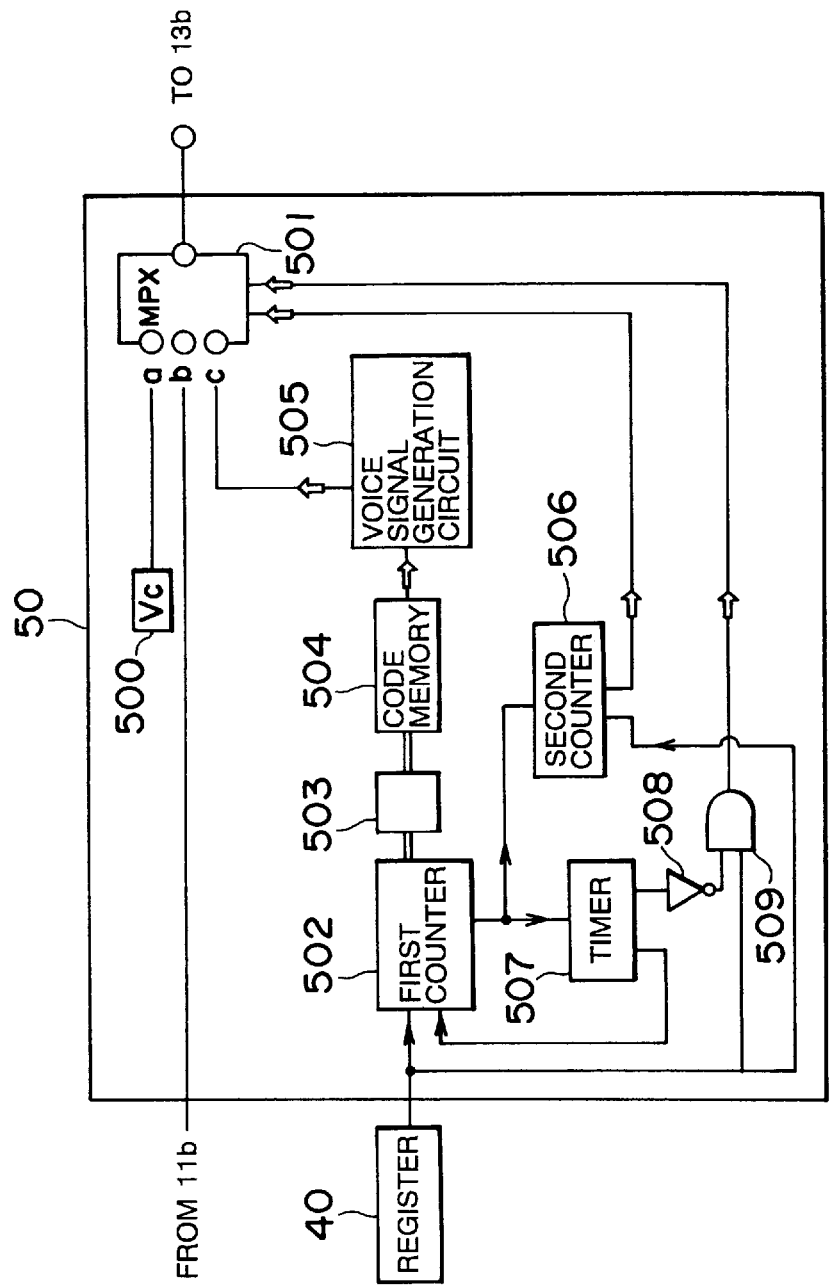
FIG. 11 is a block diagram illustrating a voice output hindrance circuit of FIG. 10.

FIG. 11 illustrates a detailed configuration of the audio signal hindrance circuit 50. As obvious from FIG. 11, the output signal of the MPEG expansion circuit for audio data 11b is inputted to an input terminal "b" of a multiplexer 501. An output signal of a silent signal generating circuit 500 is inputted to an input terminal "a" of this multiplexer 501. On the other hand, an output signal of the register 40 is inputted as a counter start signal to a first counter 502, inputted as a reset signal to a second counter 506 and then inputted to a first control terminal of the multiplexer 501 via an AND gate 509. A counter value signal of the first counter 502 is inputted to a memory access circuit 503. Further, a pulse output signal of the first counter 502 is inputted to a timer 507 and the second counter 506. An output signal of the memory access circuit 503 is inputted to a code memory 504. An output signal of this code memory 504 is inputted to a voice signal generating circuit 505. An output signal of this voice signal generating circuit 505 is inputted to an input terminal "c" of the multiplexer 501. An output signal of the timer 507 is inverted by an inverter 508 and inputted to the other input terminal of the AND gate 509. An output signal of the second counter 506 is inputted to a second control terminal of the multiplexer 501.

The first counter 502, upon receiving the start signal, starts counting up with a fixed period and inputs a count value thereof to the memory access circuit 503. This memory access circuit 503 serves to access the code memory 504 in accordance with the counter value of which the first counter 502 notifies. Hence, the first counter 502 functions as an address counter of the code memory 504. The first counter 502, when the count value thereof reaches the maximum value, outputs a single pulse to the timer 507 and the second counter 506 and stops counting up. The first counter 502, when the count value is reset to the minimum value in response to a clear signal from the timer 507, resumes the count-up.

The code memory 504 stores voice codes corresponding to individual voices (vowels, consonants, etc.) composing a voice sentence to be emitted as an alarm when the using quantity of software exceeding a limit of use in a producing sequence. Accordingly, each time the first counter 502 counts up, the code memory 504 is accessed through the memory access circuit 503, and the voice codes corresponding to the alarm voice sentence are outputted in sequence. A content of the voice sentences is that, e.g, "The using quantity comes to the limit. Following procedures once more, and please use the system. The picture is not outputted." That is, the respective voice codes are arrayed in sequence in the consecutive addresses on the code memory 504 to compose the sentences. A voice code string outputted from the code memory 504 is supplied to the voice signal generating circuit 505.

The voice signal generating circuit 505 is a commercially available voice IC chip and outputs a digital voice signal corresponding to the inputted voice code string. Hence, the voice signal generating circuit 505, when inputting a voice code string corresponding to the alarm voice sentence, outputs the digital voice signal corresponding to the alarm voice sentence to the input terminal "c" of the multiplexer 501.

The timer 507 outputs the logic value L to the inverter 508 during a normal status. Then, the timer 507, upon receiving the pulse of the first counter 502, outputs the logic value H for a fixed time, e.g., for approximately 10–20 sec. Subsequently, after this fixed time has elapsed, the logic value outputted to the inverter 508 is set to L, and the clear signal is outputted to the first counter 502. The first counter 502 again performs the count-up for outputting the alarm voice sentence from the voice signal generating circuit 505 in accordance with this clear signal.

The inverter 508 inverts the logic value outputted from the timer 507 and inputs the inverted logic value to the input terminal of the AND gate 509. Accordingly, the inverter 508 makes the AND gate 509 input the output signal of the register 40 directly to the multiplexer 501 only when the output of the timer 507 takes the logic value L but input the logic value L to the multiplexer 501 irrespective of an output status of the register 40 when the output of the timer 507 takes the logic value H from the timer.

The second counter 506 always inputs the logic value L to the multiplexer 501 when the output of the register 40 takes the logic value L. This second counter 506 is, when the output of the register 40 takes the logic value H, reset and countable. When countable, the second counter 506 counts up each time the pulse is received from the first counter 502. Then, when this count value comes to "5", the second counter 506 outputs the logic value H to the multiplexer 501.

The silent signal generating circuit 500 is a circuit for outputting a fixed voltage.

The multiplexer 501 outputs a signal received through one of the input terminals "a"–"c" to the D/A converter for audio data 13b, wherein the signal received from the AND gate 509 and the signal received from the second counter 506 serve as control signals. That is, the multiplexer 501 outputs the audio signal of the MPEG expansion circuit for audio data 11b which is received through the input terminal "b" when the output of the AND gate 509 assumes L and the output of the second counter 506 assumes L. The multiplexer 501 outputs the digital voice signal output of the voice signal generating circuit 505 which is received through the input terminal "c" when the output of the AND gate 509 assumes H and the output of the second counter 506 assumes L. The multiplexer 501 outputs the fixed voltage of the silent signal generating circuit 500 which is received through the input terminal "a" when the output of the second counter 506 assumes H.

<Operation of the Embodiment>

The software reproducer 2 in this embodiment operates in the same way with the first embodiment till the host control CPU 14 outputs the output hindrance signal. Further, the software reproducer 2 in this embodiment operates in the same manner as the operation in the second embodiment with respect to the image signal and the PC signal after the host control CPU 14 has outputted the output hindrance signal. Hence, only the operation pertaining to the audio signal will be described.

As discussed above, the register 40 continues to output the logic value L before receiving the output hindrance signal from the host control CPU 14. This logic value L is inputted to the first counter 502, the AND gate 509 and the second counter 506. Therefore, the first counter 502 does not start counting up, and therefore no pulse is inputted to the timer 507. For this reason, the AND gate 509 is brought into an open state, and hence the logic value L outputted from the register is inputted to the first control terminal of the multiplexer 501. Further, the second counter 506 continues to output the logic value L to the second control terminal of the multiplexer 501. Therefore, the multiplexer 501 outputs the audio signal of the MPEG expansion circuit for audio data 11b which is inputted through the input terminal "b" to the D/A converter for audio data 13b. As a result, the voices and sounds corresponding to the software are outputted from the loud speaker.

Also, the register 40, when receiving the output hindrance signal from the host control CPU 14, continues to output the logic value H. This logic value H is inputted to the first counter 502, the AND gate 509 and the second counter 506. Hence, the first counter 502 starts counting up with the fixed period and sequentially inputs the count value to the memory access circuit 503. The memory access circuit 503 accesses the code memory 504 in accordance with this count value and reads the voice code string corresponding to the alarm voice sentence. The voice signal generating circuit 505 to which this voice code string is inputted generates the alarm digital voice signal and input this signal to the input terminal "b" of the multiplexer. On the other hand, before the count value of the first counter 502 reaches the maximum value, the first counter 502 does not output the pulses to the timer 507 and the second counter 506. Hence, before the count value of the first counter 502 reaches the maximum value, the AND gate remains open. Accordingly, the logic value H outputted from the register 40 is inputted to the first control terminal of the multiplexer 501. Note that the reset signal takes the logic value H, and the second counter 506 is thereby reset and thus brought into the countable status. At this point of time, however, the count value is less than "5", and, hence, the logic value inputted to the second control terminal of the multiplexer 501 from the second counter 506 remains at L. Therefore, the multiplexer 501 output the digital voice signal of the voice signal generating circuit 505 which is inputted through the input terminal "c" to the D/A converter for audio data 13b. As a result, the alarm voices are outputted from the unillustrated loud speaker.

The alarm voices are outputted during the count-up by the first counter 502. Then, when the count value of the first counter 502 reaches the maximum value, the first counter 502 outputs the pulse to the timer 507 and the second counter 506. The timer 507 which received the pulse outputs the logic value H to the inverter 508 only for 10–20 sec. Therefore, the AND gate 509 closes only for 10–20 sec and input the logic value L to the first control terminal of the multiplexer 501. Note that the second counter 506 counts up one by receiving the pulse. At this point of time, however, the counter value is less than "5", and therefore the logic value outputted to the second control terminal of the multiplexer 501 from the second counter 506 remains at L. Consequently, the multiplexer 501 outputs, to the D/A converter for audio data 13b, the audio signal of the MPEG expansion circuit for audio signal 11b which is inputted through the input terminal "b" only for 10–20 sec. As a result, the software-based voices and sounds are outputted from the unillustrated loud speaker only for 10–20 sec.

After 20 sec have elapsed since the pulse input is inputted, the timer 507 outputs the clear signal to the first counter 502 and outputs the logic value L to the inverter 508 in order to open the AND gate 509. Hence, the first counter 502 re-executes the count-up from the minimum value, and the voice signal generating circuit 505 again inputs the alarm digital voice signal to the input terminal "c" of the multiplexer 501. Further, the AND gate 509 outputs the logic value H to the first control terminal of the multiplexer 501. Therefore, the multiplexer 501 again outputs the digital voice signal of the voice signal generating circuit 505 which is inputted through the input terminal "c" to the D/A converter for audio signal 13b. In consequence of this, the alarm voices are outputted from the unillustrated loud speaker.

In the manner described above, the alarm voices and the voices and sounds corresponding to the software are alternately outputted. Then, when the alarm voices are outputted five times repeatedly, the count value of the second counter 506 comes to "5", and the logic value inputted to the second control terminal of the multiplexer 501 from the second counter 506 assumes H. Hence, the multiplexer 501 always outputs a low voltage of the silent signal generating circuit 500 which is inputted through the input terminal "a" to the voice oriented D/A converter 13b regardless of the logic value inputted to the first control terminal from the AND gate 509. The logic value inputted from the second control terminal from the second counter 506 remains at H as far as the output from the register 40 does not assume L. Consequently, thereafter, the voices and sounds are not outputted at all from the unillustrated loud speaker.

Note that the output signal of the silent signal generating circuit 500 may be a fixed audible frequency signal, e.g., a tone signal of 1000 Hz.

As discussed above, in accordance with this embodiment, in addition to the image signal and the PC signal, the output of the audio signal is completely stopped after alarming for a fixed time. However, the software user's desire for the continuous use is, it can be considered, enhanced by the voice output given forth intermittently in the intervals of alarming. As a result, the software user is prompted to pay the charge for use to the software rightful claimant as a compensation for adding the accounting count value X by removing the SD circuit 9 out of the software reproducer 2.

Fourth Embodiment

<Construction of the Embodiment>

Figure 12:
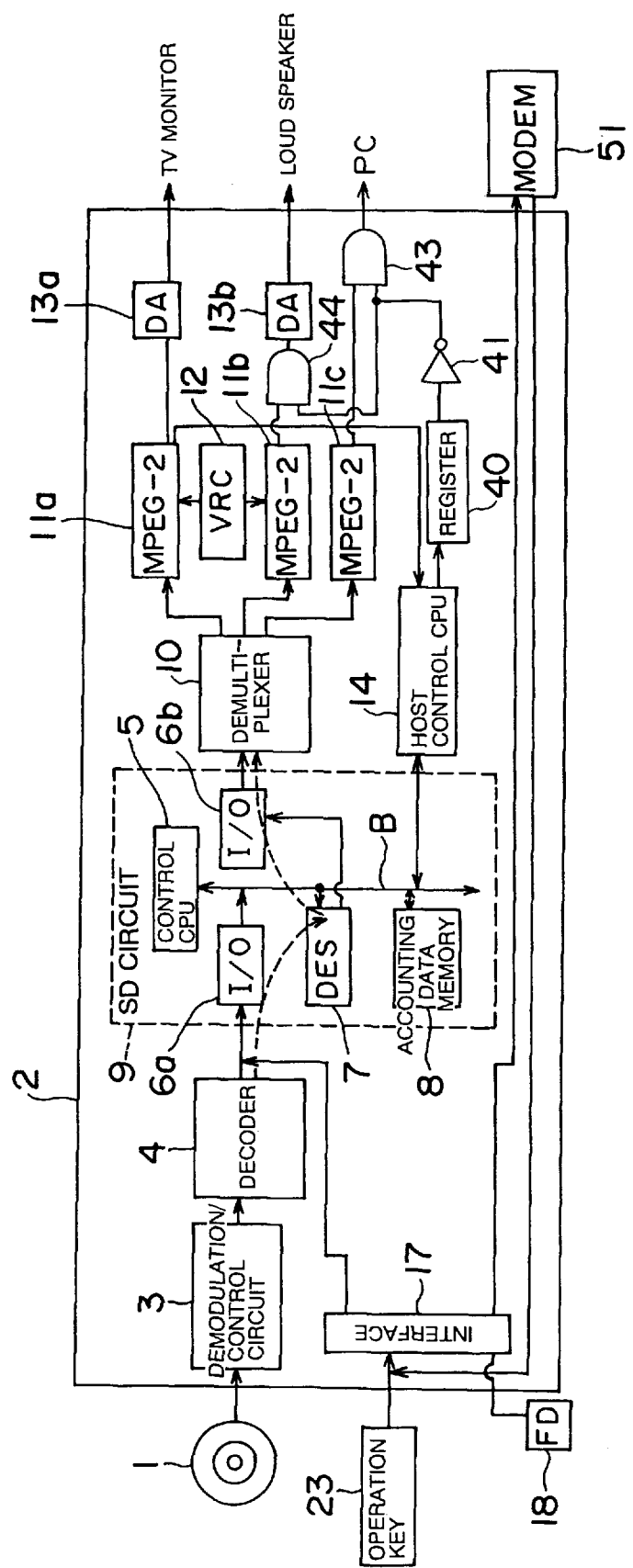
FIG. 12 is a block diagram illustrating a construction of the software reproducer in a fourth embodiment of the present invention.

FIG. 12 is a block diagram illustrating a construction of the software reproducer employed in a fourth embodiment of the present invention.

This embodiment takes, as in the same way with the first embodiment, a construction of counting the number of operations of expanding the video data frame compressed based on the MPEG standards and subtracting the accounting count value X in accordance with the number of operations thereof. This embodiment also takes a construction of completely stopping the audio signal and the PC signal while outputting the normal image signal as an output hindrance when the accounting count value X becomes 0.

In accordance with this embodiment, the format of the software supplied to the software reproducer 2 is absolutely the same as that in the first embodiment. Further, the same components of the software reproducer 2 in this embodiment as those in the first embodiment are marked with the numerals identical with those in the first embodiment. Hereinbelow, the explanation of these common elements will be omitted, but there is explained only a configuration of a device for hindering the output in accordance with the output hindrance signal transmitted from the host control CPU 14.

The output hindrance signal from the host control CPU 14 is inputted to the register 40. This register 40 outputs the logic value L in the initial status but, when detecting a rise of the inputted output hindrance signal, continues to output the logic value H thereafter.

An output signal of this register 40 is inverted by an inverter 41. Hence, the inverter 41 outputs the logic value H in the initial status but, after outputting the output hindrance signal, continues to output the logic value L.

An output of this inverter 41 is supplied to the input terminal of an AND circuit for audio data 44. The other input terminal of this AND circuit for audio data 44 is connected to an output terminal of the MPEG expansion circuit for audio data (MPEG-2) 11b. Accordingly, this AND circuit for audio data 44 serves as a gate for the voice signal inputted to the D/A converter for audio data 13b from the MPEG expansion circuit for audio data 11b. For this reason, a passage of the voice signal is permitted only when the output signal of the inverter 41 takes the logic value H, and, therefore, the analog voice signal is outputted from the D/A for audio data converter 13b to the unillustrated loud speaker. Also, when the output signal of the inverter 41 takes the logic value L, the passage of this voice signal is inhibited, and hence no analog voice signal is outputted from the D/A converter for audio data 13b.

The output of the inverter 41 is supplied to also the input terminal of the AND circuit for PC signal 43. The other input terminal of the AND circuit for PC signal 43 is connected to the output terminal of the MPEG expansion circuit for PC signal MPEG-2) 11c. Accordingly, this AND circuit for PC signal 43 serving as a gate for the PC signal permits the passage of this PC signal only when the output signal of the inverter 41 takes the logic value H but inhibits the passage of the PC signal when the output signal of the inverter 41 takes the logic value L.

Note that an AND circuit serving as the gate is not provided on the output terminal of the MPEG expansion circuit for video data 11a. Hence, even when the output hindrance signal is outputted from the host control CPU 14, the analog video signal from the D/A converter for video data 13a is normally outputted as before.

Incidentally, when the reset signal is transmitted from the host control CPU 14, the register 40 outputs logic value L.

<Operation of the Embodiment>

The software reproducer 2 in this embodiment operates in the same way with the first embodiment till the host control CPU 14 outputs the output hindrance signal. Accordingly, there will hereinafter be explained only the operation after the host control CPU 14 has outputted the output hindrance signal.

Figure 13:
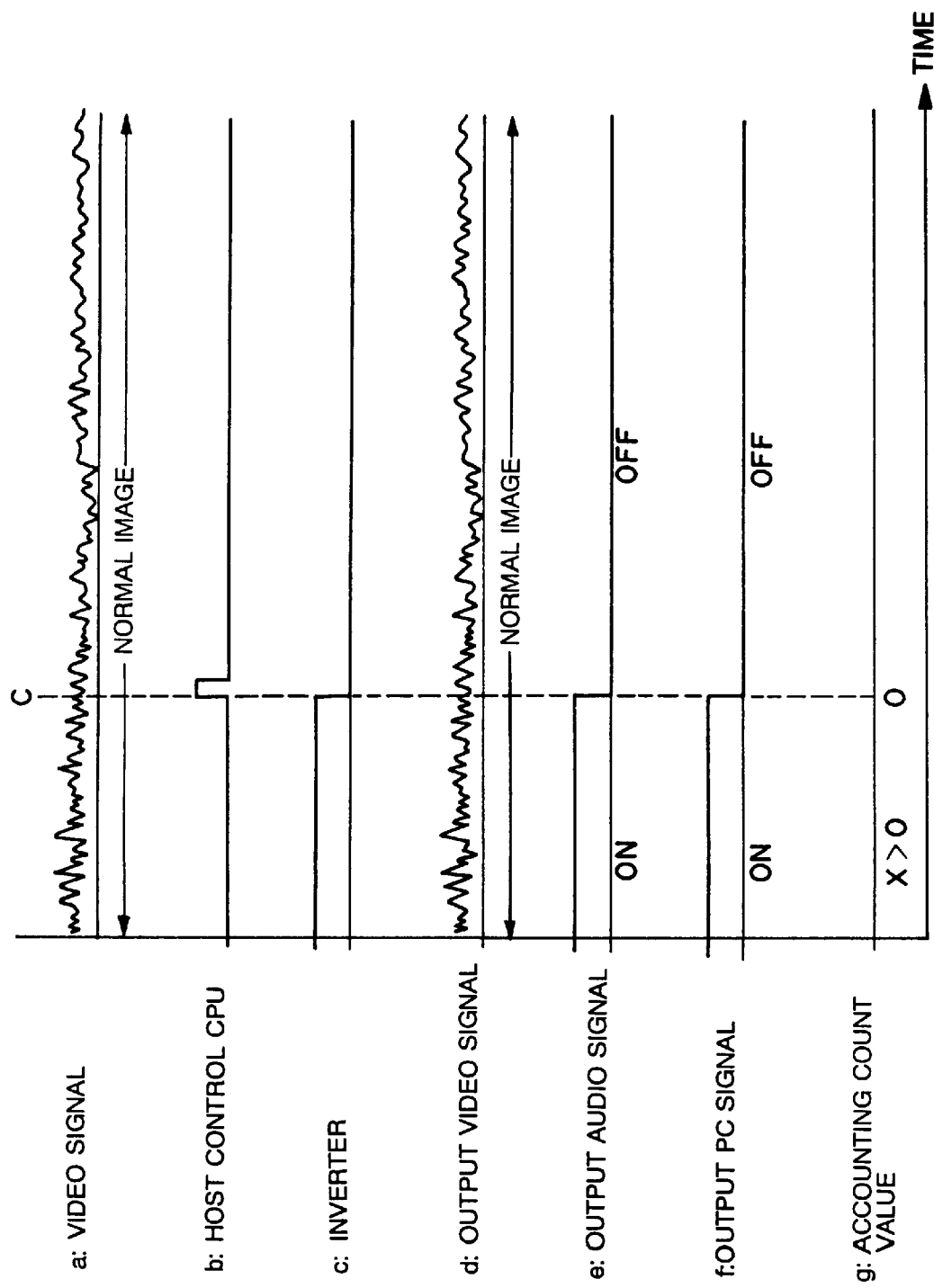
FIG. 13 is a time chart showing signal statuses in the respective units of FIG. 12.

If the accounting count value X stored in the accounting data memory 8 becomes 0 as a result of the decrement, the signal status in each unit goes as illustrated in FIG. 13. FIG. 13 shows that the accounting count value X comes to 0 at a timing "C" (see FIG. 13(g)).

The DES 7 decrypts the data even after the accounting count value X has become 0, and, therefore, the normal audio signal continues to be outputted from the MPEG expansion circuit for audio data 11b after the timing "C" (see FIG. 13(a)).

Next, the host control CPU 14, when the accounting count value X comes to 0 at the timing "C", outputs the pulse-like output hindrance signal (see FIG. 13(b)).

The register 40 which outputted the logic value L before the timing "C" outputs the logic value H after the timing "C", synchronizing with a rise of the received output hindrance signal.

Accordingly, the inverter 41 for receiving the output of this register 40 outputs the logic value H before the timing "C" outputs the logic value L after the timing "C" (see FIG. 13(c)).

The AND circuit for audio data 44 for permitting or inhibiting the passage of the voice signal in accordance with the output signal of this inverter 41 outputs a normal audio signal before such the timing "C" when the accounting count value X(g) is larger than 0. Then, the AND circuit 44 inhibits the output of the audio signal after the timing "C" when the accounting count value X(g) becomes 0 (see FIG. 13(e)).

Similarly, the AND circuit for PC signal 43 for permitting or inhibiting the passage of the PC signal in accordance with the output of the inverter 41 outputs the PC output to the outside of the device 2 before the timing "C" when the accounting count value X(g) is larger than 0 but inhibits the output of the PC output to the outside of the device 2 after the timing "C" when the accounting count value X(g) becomes 0 (see FIG. 13(f)).

Note that the image signal continues to be normally outputted before and after the timing "C" (see FIG. 13(d)).

Accordingly, after the timing "C" when the accounting count value becomes 0, there is effected such an output hindrance as to inhibit the output to the outside of the software reproducer 2 with respect to only the audio signal and the PC signal among the three outputs (image signal, voice signal and PC signal). At this time, however, the image signal remains to be normally given forth. Therefore, the relevant software user is capable of recognizing that the accounting count value X becomes 0 without such a misconception that a trouble happens in the device 2.

As described above, in accordance with this embodiment, the PC signal is inhibited from being given forth to the outside of the software reproducer 2, and it is therefore possible to prevent an illegal use of the computer program. Note that the image signal continues to be normally outputted, but, the profit of the software rightful claimant is not infringed if the software is based on the voice or sound (e.g., video of a classic concert, an karaoke video, a linguistic study video, etc.). This rather, it can be considered, produces an effect of enhancing a desire for the continuous use by the software user. As a result, the software user is prompted to pay the charge for use to the software rightful claimant as a compensation for adding the accounting count value X by removing the SD circuit 9 out of the software reproducer 2.

Fifth Embodiment

<Construction of the Embodiment>

Figure 14:
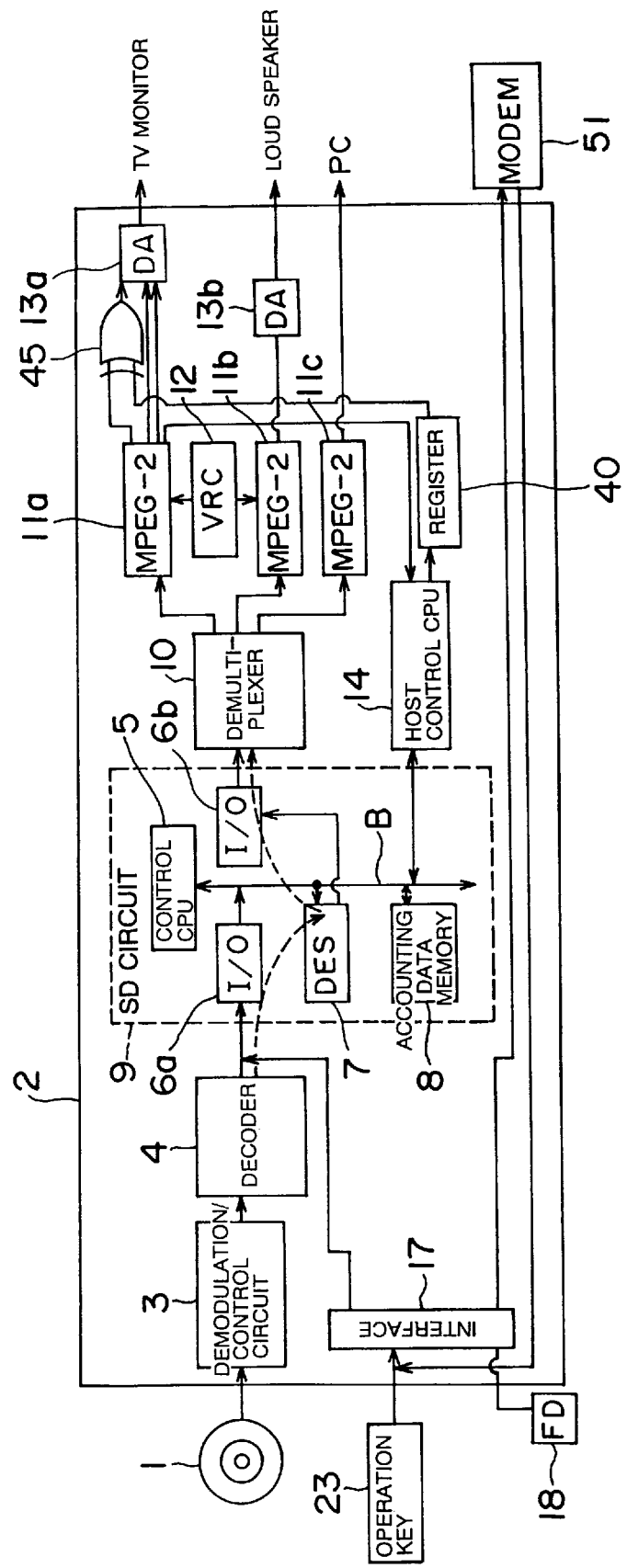
FIG. 14 is a block diagram illustrating a construction of the software reproducer in a fifth embodiment of the present invention.

FIG. 14 is a block diagram illustrating a construction of the software reproducer employed in a fifth embodiment of the present invention.

This embodiment takes, as in the same way with the first embodiment, a construction of counting the number of operations of expanding the video data frame compressed based on the MPEG standards and subtracting the accounting count value in accordance with the number of operations thereof. This embodiment also takes a construction of inverting a brightness and darkness of the image signal while outputting the normal audio signal and the PC output as an output hindrance when the accounting count value becomes 0.

In accordance with this embodiment, the format of the software supplied to the software reproducer 2 is absolutely the same as that in the first embodiment. Further, the same components of the software reproducer 2 in this embodiment as those in the first embodiment are marked with the numerals identical with those in the first embodiment. Hereinbelow, the explanation of these common elements will be omitted, but there is explained only a configuration of a device for hindering the output in accordance with the output hindrance signal transmitted from the host control CPU 14.

In this embodiment, the adder circuit 19 used in the first embodiment is not prepared. Therefore, the output signal of the A/D converter for video data 13a is outputted directly to the outside of the software reproducer 2. In accordance with this embodiment, an exclusive OR circuit 45 is provided between the MPEG expansion circuit for video data (MPEG-2) 11a and the A/D converter for video data 13a. Describing it in greater detail, an output line extending from the MPEG expansion circuit for video data (MPEG-2) 11a is composed of an output line for a blue color video signal, an output line for a green color video signal and an output line for a red color video signal. Then, the output line for each color video signal is composed of an output line of a signal for indicating an intensity and an output line of a signal for indicating a polarity. The above exclusive OR circuit 45 is provided on the output line indicating the polarity in each color. That is, this polarity signal is inputted to one input terminal of the exclusive OR circuit 45. Further, an output signal of the register 40 is inputted to the other input terminal of the exclusive OR circuit 45. This register 40 receives the output hindrance signal from the host control CPU 14. Then, this register 40 outputs the logic value L in the initial status but, when detecting a rise of the inputted output hindrance signal, continues to output the logic value H thereafter. The exclusive OR circuit 45, when the output signal of the register 40 takes the logic value L, permits a passage of the polarity signal of the MPEG expansion circuit for video data 11a as it is but, when the output signal of the register 40 takes the logic value H, inverts the polarity signal of the MPEG expansion circuit for video data 11a and then permits a passage of this inverted signal. As a result, the analog image signal given forth from the D/A converter for video data 13a indicates, when the output signal of the register 40 takes the logic value L, a normal image on the unillustrated TV monitor unit but indicates, when the output signal of the register 40 takes the logic value H, a brightness-inverted image on the unillustrated TV monitor unit.

Note that the above-mentioned logic circuit is not connected to the output terminal of the MPEG expansion circuits for audio signal and PC signal 11b, 11c. Hence, even when the output hindrance signal is outputted from the host control CPU 14, the analog audio signal and the PC signal are normally outputted as before.

Note that the register 40 outputs the logic value L when the reset signal is transmitted from the host control CPU 14, <Operation of the Embodiment>

The software reproducer 2 in this embodiment operates in the same way with the first embodiment till the host control CPU 14 outputs the output hindrance signal. Accordingly, there will hereinafter be explained only the operation after the host control CPU 14 has outputted the output hindrance signal.

Figure 15:
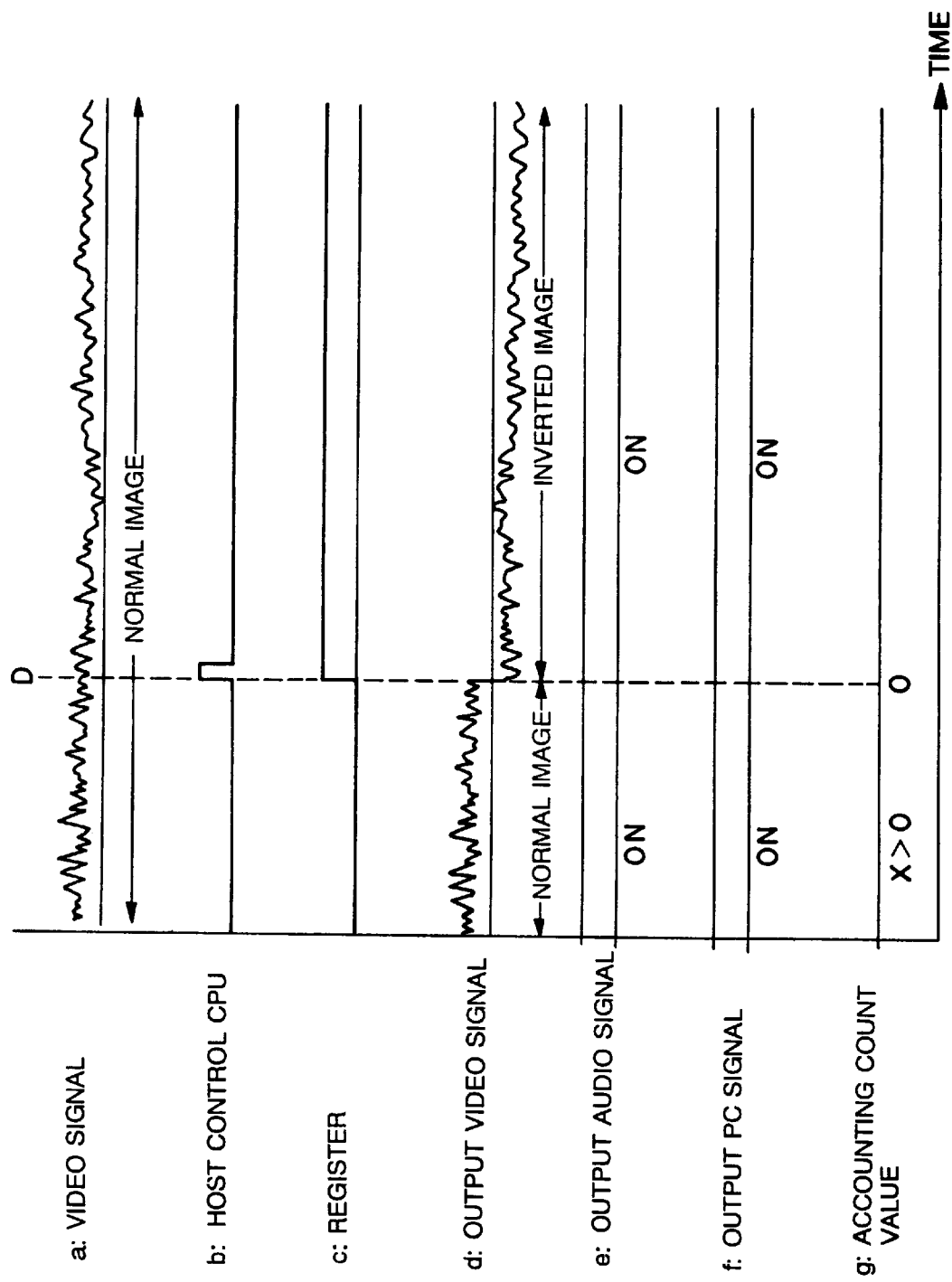
FIG. 15 is a time chart showing signal statuses in the respective units of FIG. 14.

If the accounting count value X stored in the accounting data memory 8 becomes 0 as a result of the decrement, the signal status in each unit goes as illustrated in FIG. 15. FIG. 15 shows that the accounting count value X comes to 0 at a timing "D" (see FIG. 15(g)).

The DES 7 decrypts the data even after the accounting count value X has become 0, and, therefore, the normal analog video signal continues to be outputted from the MPEG expansion circuit for video data 11a after the timing "D", too (see FIG. 15(a)).

The host control CPU 14, when the accounting count value X comes to 0 at the timing "D", outputs the pulse-like output hindrance signal (see FIG. 15(b)).

The register 40 which outputs the logic value L before the timing "D" outputs the logic value H after the timing "D", synchronizing with a rise of the received output hindrance signal.

The exclusive OR circuit 45 receiving the output signal of this register 40 through its one input terminal directly outputs the video polarity signal received through the other input terminal before the timing "D". Accordingly, the normal analog video signal is outputted from the video D/A converter for video data 13a. In contrast with this, the exclusive OR circuit 45 inverts the video polarity signal received through the other input terminal and outputs this inverted signal after the timing "D". Hence, the brightness-inverted analog videos signal is outputted from the D/A converter for video data 13a (see FIG. 15(d)).

Note that the audio signal and the PC output continue to be outputted normally before and after the timing "D" (see FIGS. 15(e), 15(f)).

Accordingly, after the timing "D" when the accounting count value comes to 0, there is effected such an output hindrance as to invert the brightness of the image with respect to only the image signal among the three outputs (image signal, audio signal and PC signal). At this time, however, the voice signal and the PC signal remain to be normally outputted. Therefore, the user watching the unillustrated TV monitor unit is capable of recognizing that the accounting count value X becomes 0 without such a misconception that a trouble happens in the device 2.

At this moment, the audio signal and the PC signal remain to be normally given forth. If the software is based mainly on the picture (e.g., movie, animation, etc.), however, a profit of the software rightful claimant is not infringed. This rather, it can be considered, produces an effect of enhancing a desire for the continuous use by the software user. As a result, the software user is prompted to pay the charge for use to the software rightful claimant as a compensation for adding the accounting count value X by removing the SD circuit 9 out of the software reproducer 2.

Sixth Embodiment

<Construction of the Embodiment>

Figure 16:
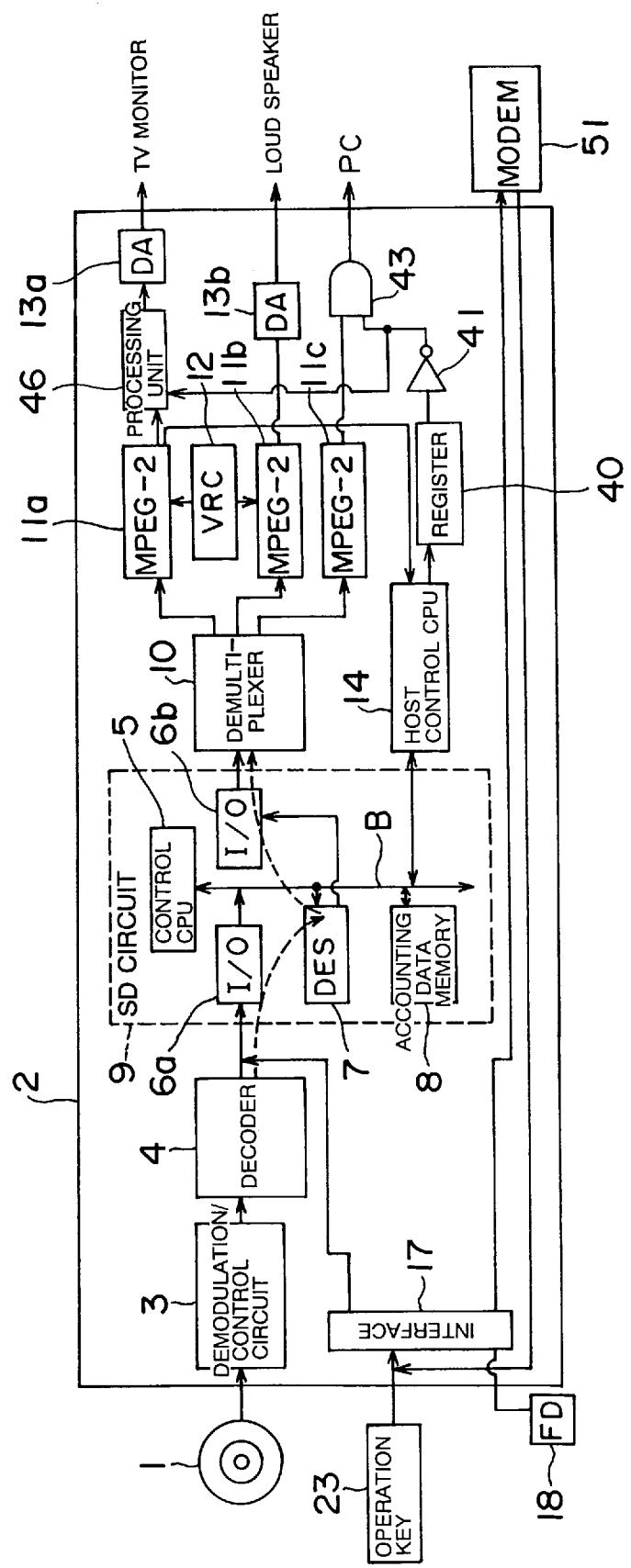
FIG. 16 is a block diagram illustrating a construction of the software reproducer in a sixth embodiment of the present invention.

FIG. 16 is a block diagram illustrating a construction of the software reproducer employed in a sixth embodiment of the present invention.

This embodiment, as in the same way with the first embodiment, takes a construction of counting the number of operations of expanding the video data frame compressed based on the MPEG standards and reducing the accounting count value X in accordance with the number of operations thereof. This embodiment also takes a construction of outputting the image signal on which a dummy signal is superimposed while continuing to output the normal audio signal and the PC signal as an output hindrance when the accounting count value X becomes 0.

Figure 17:
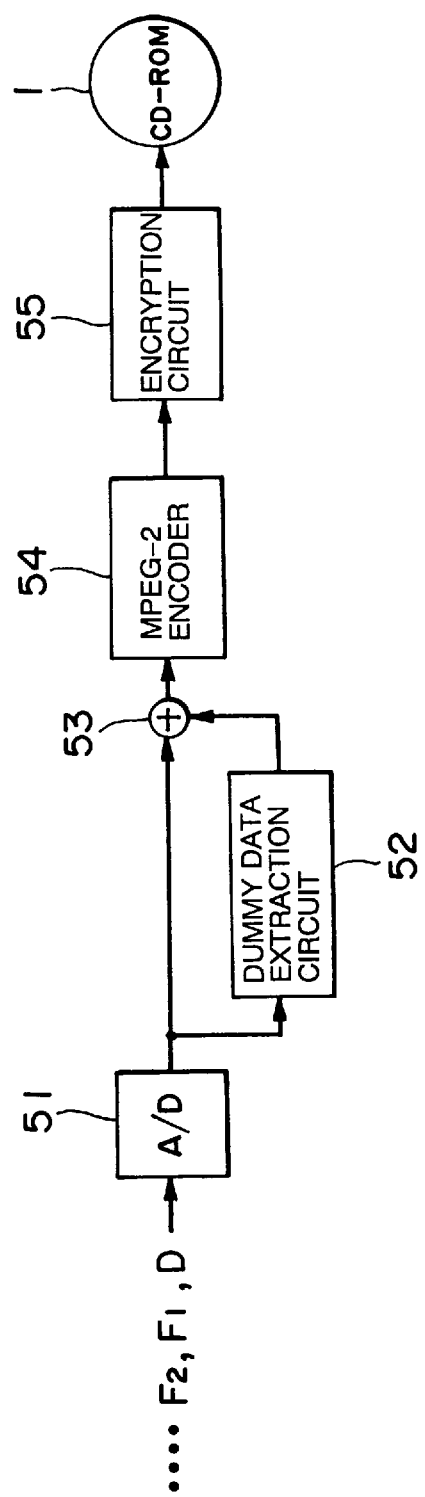
FIG. 17 is a block diagram showing a device for causing a CD-ROM to store data, which is employed in the sixth embodiment of the present invention.

In accordance with this embodiment, the format of the variety of software stored in the CD-ROM1 will be explained. FIG. 17 is a block diagram illustrating a configuration of a circuit employed when this CD-ROM1 stores the video data. Referring to FIG. 17, $F_1, F_2, \ldots$ indicate analog image frames. Further, the symbol D represents dummy data. This item of dummy data involves the use of image data for displaying patterns based on, e.g., random numbers. These frames D, $F_1$, $F_2$, ... are inputted to an A/D converter 51 in sequence. This A/D converter 51 converts these frames D, $F_1$, $F_2$, ... into digital data. An output of the A/D converter 51 is inputted to a dummy data extraction circuit 52 as well as to an adder circuit 53. This dummy data extraction circuit 52 extracts only the dummy data D out of inputted pieces of data. In the adder circuit 53, the dummy data D extracted by this dummy data extraction circuit 52 are superimposed on the frames $F_1$, $F_2$, ... inputted directly to the adder circuit 53 from the A/D converter 51. Hence, outputs of the adder circuit 53 are D, $F_1$+D, $F_2$+D, ... The outputs D, $F_1$+D, $F_2$+D, ... of the adder circuit 53 are inputted next to an MPEG-2 encoder 54 and then compressed based on the MPEG-2 standards. The frames D, $F_1$+D, $F_2$+D, ... compressed by this MPEG-2 encoder 54 are hereinafter expressed by D', F'($F_1$+D), F'($F_2$+D), ... The outputs D', F'($F_1$+D), F'($F_2$+D), ... of the MPEG-2 encoder 54 are inputted next to an encryption circuit 55. This encryption circuit 55 effects the encryption by use of a predetermined encryption key. The frames D', F'($F_1$+D), F'($F_2$+D), ... encrypted by this encryption circuit 55 are next written to the CD-ROM1. As a matter of fact, these frames are temporarily written to an original panel, and, thereafter, bit patterns thereof are printed on the commercially available CD-ROM1.

Note that the dummy data D is not put on the heading of the voice signal, and hence the dummy data D is not added by the adder circuit 53 but directly inputted to the MPEG-2 encoder 54. Further, with respect to the computer program also, the dummy data D is not put and therefore inputted directly to the MPEG-2 encoder 54. The computer program is not, however, compressed by the MPEG-2 but only encrypted by the encryption circuit 55.

The CD-ROM1 stores the data undergoing the A/D processing, the encryption processing and the compression processing. The data having the same format are inputted to this software reproducer 2 through the communications from the software vendor demodulated by a modem 51.

The majority of components of the software reproducer 2 in this embodiment are common to those of the software reproducer 2 in the first embodiment. Accordingly, the same components of the software reproducer 2 as those in the first embodiment are marked with the numerals identical with those in the first embodiment, Hereinbelow, the explanation of these common elements will be omitted, and there will be explained only a construction of a device for hindering the output in accordance with the output hindrance signal from the host control CPU 14.

Figure 18:
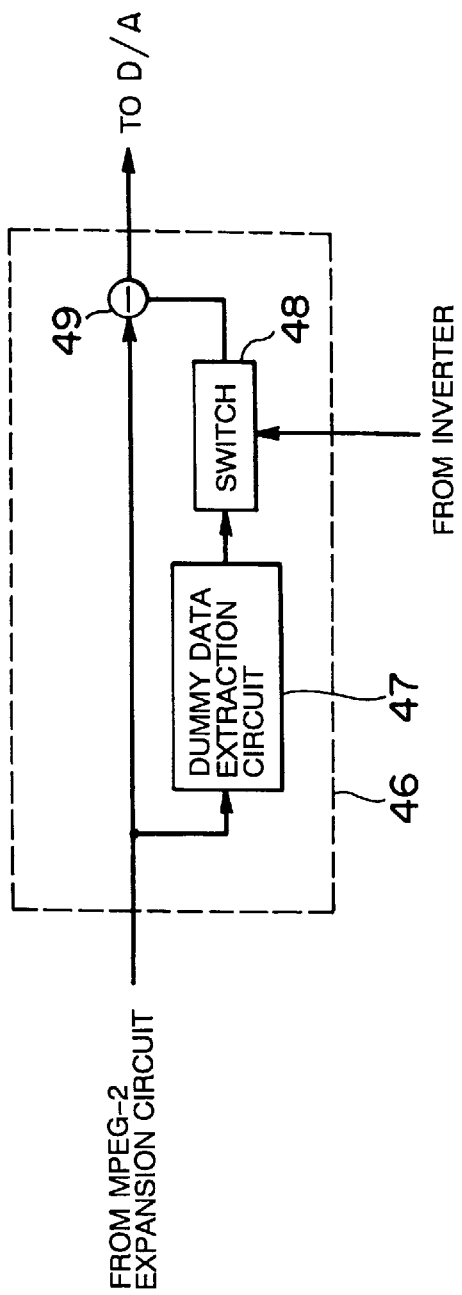
FIG. 18 is a block diagram illustrating a configuration of a processing unit of FIG. 16.

In accordance with this embodiment, the adder circuit 19 used in the first embodiment is not prepared. Therefore, the output of the A/D converter for video data 13a is outputted directly to the outside of the software reproducer 2. In accordance with this embodiment, a processing unit shown in FIG. 18 is provided between the MPEG expansion circuit for video data (MPEG-2) 11a and the A/D converter for video data 13a.

The MPEG expansion circuit for video data 11a for outputting the signal to this processing unit 46 expands the data frames D', F'($F_1$+D), F'($F_2$+D), ... decrypted by the DES 7. The restored data frames D, $F_1$+D, $F_2$+D, ... are inputted to the processing unit 46.

On the other hand, the output hindrance signal from the host control CPU 14 is inputted to the register 40. This register 40 outputs the logic value L in the initial status but, upon detecting the rise of the inputted output hindrance signal, continues to output the logic value H thereafter.

The output signal of this register 40 is inverted by the inverter 41. Hence, the inverter 41 outputs the logic value H in the initial status but continues to output the logic value L after outputting the output hindrance signal.

The output of this inverter 41 is supplied to an input terminal of an AND circuit for PC signal 43. The other input terminal of this AND circuit for PC signal 43 is connected to an output side of the MPEG expansion circuit for video data (MPEG-2) 11c. Accordingly, this AND circuit for PC signal 43 serves as a gate for the PC signal. For this reason, a passage of this PC signal is permitted only when the output of the inverter 41 takes the logic value H but inhibited when the output of the inverter 41 takes the logic value L.

The output of the inverter 41 is inputted also to the processing unit 46. Herein, a specific configuration of the processing unit 46 will be described with reference to FIG. 18. Referring to FIG. 18, an output line from the MPEG expansion circuit for video data (MPEG-2) 11a is connected to the dummy data extraction circuit 47 and a subtracter circuit 49. An output line from this dummy data extraction circuit 47 is connected via a switch circuit 48 to the subtracter circuit 49. The dummy data extraction circuit 47 extracts only the dummy data frame D from the data frames D, $F_1$+D, $F_2$+D, ... outputted from the MPEG expansion circuit for video data (MPEG-2) 11a and continues to output this dummy data frame D. The switch circuit 48 logically opens and closes a signal line between the dummy data extraction circuit 47 and the subtracter circuit 49 in accordance with the output signal of the inverter 41. More specifically, when the output signal of the inverter 41 takes the logic value H, this signal line is closed to input the dummy data frame D to the subtracter circuit 49. On the other hand, when the output signal of the inverter 41 takes the logic value L, the switch circuit 48 opens this signal line to inhibit the input of the dummy data frame D to the subtracter circuit 49. The subtracter circuit 49 logically subtracts the dummy data D received from the dummy data extraction circuit 48 from the data frames $F_1$+D, $F_2$+D, ... received from the MPEG expansion circuit (MPEG-2) 11a. Hence, the output data frames of the subtracter circuit 9 after effecting the subtraction turn out D, $F_1$, $F_2$, ... An execution of the above subtraction is, however, confined to a case where the switch circuit 48 closes the signal line on receiving the output of the logic value H from the inverter 41.

In contrast with this, the switch circuit 48 opens when the inverter 41 outputs the logic value L, and the dummy data D is not therefore inputted to the subtracter circuit 49. Accordingly, nothing is subtracted from the data frames $F_1$+D, $F_2$+D, ... received from the MPEG expansion circuit for video data (MPEG-2) 11a. Hence, the subtracter 49 directly outputs the received data frames D, $F_1$+D, $F_2$+D, ... to the D/A converter for video data 13a.

Note that the above-mentioned processing unit 46 is not connected to the output sides of the MPEG expansion circuit for video data 11b and of the MPEG expansion circuit for PC signal 11c. Therefore, even when the output hindrance signal is outputted from the host control CPU 14, the analog audio signal and the PC signal are normally outputted as before.

Incidentally, when the reset signal is transmitted from the host control CPU 14, the register 40 stops the outputs logic value L.

<Operation of the Embodiment>

The software reproducer 2 in this embodiment operates in the same way with the first embodiment till the host control CPU 14 outputs the output hindrance signal. Accordingly, there will hereinafter be explained only the operation after the host control CPU 14 has outputted the output hindrance signal.

Figure 19:
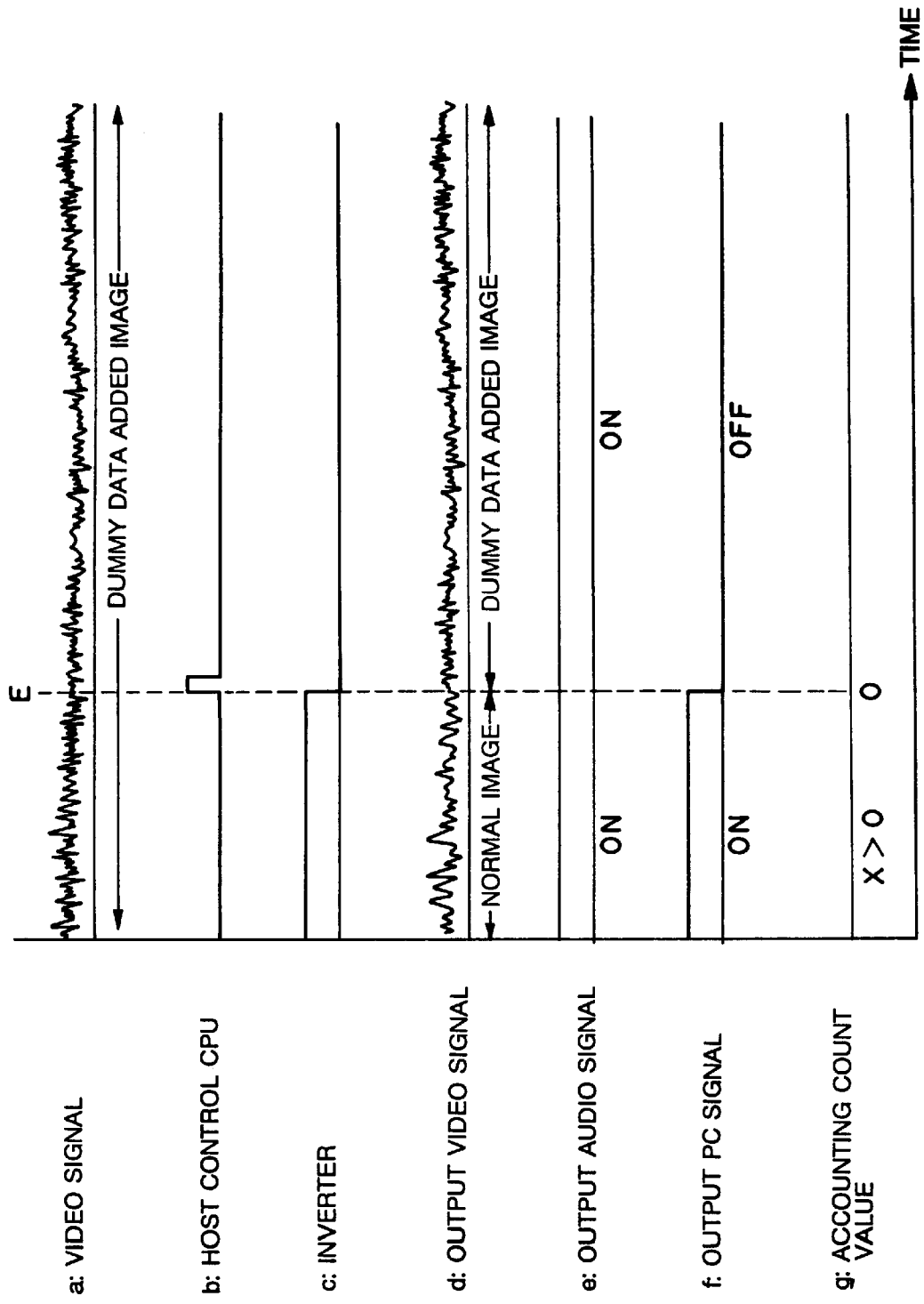
FIG. 19 is a time chart showing signal statuses in the respective units of FIG. 16.

If the accounting count value X stored in the accounting data memory 8 becomes 0 as a result of the decrement, the signal status in each unit goes as illustrated in FIG. 19. FIG. 19 shows that the accounting count value X comes to 0 at a timing "E" (see FIG. 19(*g*)).

The DES 7 decrypts the data even after the accounting count value X has become 0, and, therefore, the same video signal to which dummy data is added as the previous one is continuously outputted after the timing "E" also (see FIG. 19(*a*)). The host control CPU 14, when the accounting count value X comes to 0 at the timing "E", outputs the pulse-like output hindrance signal (see FIG. 19(*b*)).

The register 40 which outputted the logic value L before the timing "E" outputs the logic value H after the timing "E", synchronizing with a rise of the received output hindrance signal.

Accordingly, the inverter 41 for receiving the output signal of this register 40 outputs the logic value H before the timing "E" but outputs the logic value L after the timing "E" (see FIG. 19(*c*)).

The AND circuit for PC signal 43 for permitting or inhibiting the passage of the PC signal in accordance with the output of the inverter 41 outputs the PC signal before such the timing "E" when the accounting count value X(g) is larger than 0 but inhibits the output of the PC signal to the outside of the device 2 after the timing "E" when the accounting count value X(g) becomes 0 (see FIG. 19(*f*)).

Further, the switch circuit 48 permits or inhibits the passage of the dummy data D extracted by the dummy data extraction circuit 47 in accordance with the output signal of this inverter 41. As a result, the subtraction circuit 47, i.e., the processing unit 46 outputs the data frames D, $F_1$, $F_2$, . . . to the D/A converter for video data 13a before the timing "E" when the accounting count value X(g) is larger than 0. For this reason, the D/A converter for video data for audio signal 13a is capable of outputting the analog video signal for displaying a normal image on the unillustrated TV monitor unit. The initial dummy data frame D is not, however, displayed. Further, the substraction circuit 47, viz., the processing unit 46 output the data frames D, $F_1$+D, $F_2$+D, . . . remaining added with the dummy data D to the D/A converter for video data 13a before the timing "E" when the accounting count value X(g) becomes 0. Therefore, it follows that the D/A converter for video data 13a outputs the video signal (to which the dummy data is added) for displaying an unrecognizable image on the unillustrated TV monitor unit.

Note that the audio signal continues to be normally outputted before and after the timing "E" (see FIG. 19(*e*)).

Accordingly, after the timing "E" when the accounting count value comes to 0, there are effected such an output hindrance that the dummy data D for displaying the unrecognizable image remains unremoved with respect to the image signal and also such an output hindrance that the output to the outside of the software reproducer 2 is inhibited with respect to the PC signal among the three outputs (image signal, audio signal and PC signal). At this time, however, a voice signal C remains to be normally outputted. Therefore, the user watching the unillustrated TV monitor unit is capable of recognizing that the accounting count value X becomes 0 without such a misconception that a trouble happens in the device 2. Incidentally, if the software is based mainly on the picture (e.g., movie, animation, etc.), a profit of the software rightful claimant is not infringed even when the audio signal remains to be normally outputted. This rather, it can be considered, produces an effect of enhancing a desire for the continuous use by the software user. As a result, the software user is prompted to pay the charge for use to the software rightful claimant as a compensation for adding the accounting count value X by removing the SD circuit 9 out of the software reproducer 2.

[Other Modified Examples]

In each embodiment discussed above, there is performed the hindrance processing such as to process the image or the voices and sounds with respect to the image signal and the audio signal, However, the following hindering device is adoptable for a personal computer oriented output, i.e., the PC signal shown in each of the Figures in the embodiments.

For instance, this hindering device will be explained with reference to FIG. 2.

Added to the operation program of the host control CPU 14 is an operation program for outputting a hindrance image signal program through the I/O unit 6b before the DES 7 decrypts the accounting target software when the accounting count value X in the accounting data memory 8 becomes 0.

In this case, it is required that the host control CPU 14 be provided with a memory for storing the hindrance image signal program. At the same time, it is required that a circuit for interfacing a read output of the memory with the PC signal be connected. A hindrance image program is created based on a program system of a personal computer connected to the present device 2. The hindrance image program is constructed to be started immediately after this personal computer has installed a program from the CD-ROM1. The hindrance image program is constructed of hindrance image data and a command for reading this item of hindrance image data from an address location in which the data is stored and outputting the data to a display unit such as a CRT, etc. of the personal computer. The hindrance image data serves to display, e.g., a message "The desired installed program is unusable because of the accounting limit. Please, bring the SD card to a nearby sales shop.".

The following are the operation procedures of the host control CPU 14.

The control CPU 5 notifies, just when a content of the accounting data memory 8, i.e., the effect that the accounting count value X becomes 0, the effect to the host CPU 14. The host control CPU 14 stores a register area of a memory with this effect and, starts up the operation program for reading the hindrance image signal program. The thus started operation program works to read the image hindrance output program byte by byte from an unillustrated memory. Then, the image hindrance output program is outputted to the demultiplexer 10 via the I/O unit 6b. Hereupon, this image hindrance output program is demultiplexed in the form of the PC signal and then outputted to the unillustrated personal computer via the MPEG expansion circuit for video data 11c. The output to this unillustrated personal computer is effected in a serial or byte-serial manner. When reading and outputting the image hindrance output program has been all finished, the host control CPU 14 finishes the operation but brought into a standby status for the next processing. On the other hand, the personal computer connected to this software reproducer 2, when completely installing the outputted image hindrance output program, starts up this image hindrance output program as an initial program. In response to this start-up, the image hindrance output program is allocated to a predetermined address area in a main memory of this personal computer. Then, the hindrance image data is developed on an image memory, etc. The developed hindrance image is output-displayed on a monitor display unit of the personal computer. The output hindrance can be thereby performed for the PC oriented application software read from the CD-ROM1. Then, the software user is capable of knowing the necessity for paying the charge for use from the displayed hindrance image.

As discussed above in detail, the hindrance mechanisms for the respective outputs shown in the embodiments are independently considered. The hindrance mechanisms illustrated in the individual embodiments discussed above can be combined in a variety of forms in accordance with the gist of the present invention. For instance, the first embodiment illustrated in FIG. 2 has presented the construction of superimposing and outputting the hindrance display patterns on the decrypted image signals. However, there may be taken such a construction that the audio signal passes through a voice signal hindrance circuit 50 shown in FIGS. 10 and 11. Further, with respect to the PC signal, the circuitry explained by way of other modified embodiment described above may be incorporated into the control CPU 14. Moreover, in the sixth embodiment illustrated in FIG. 16, there has been shown the construction of effecting the D/A conversion, with the dummy data added to the decrypted image signal. There may be, however, taken such a construction that the audio signal passes through the voice signal hindrance circuit 50 shown in FIGS. 10 and 11. Further, with respect to the PC signal, the circuitry described by way of other embodiment explained above may be incorporated into the control CPU 14.

According to the present invention, in the case of the using the software in excess of the predetermined usable quantity, the use of the software can be hindered while notifying the software user of the fact that the software using quantity reaches the predetermined usable quantity by outputting the data in the incomplete form.

This invention being thus described, it will be obvious that same may be varied in same way. Such variations are not regarded as a departure from the spirit and scope of the invention, and all such modifications would be obvious to one skilled in the art intended to be included within the scope of the following claims.

What is claimed is:

1. A software usage management apparatus comprising:
   a detector to detect a usage of software and output a value indicating the usage of the software;
   a determining block to determine when the usage of the software, detected by said detector, has reached a predetermined value; and
   a hindering block to stop the useful output of the software by outputting a signal produced by the software in a different form when said determining block determines that the usage of the software reaches the predetermined value.

2. A software usage management apparatus according to claim 1, wherein said hindering block outputs a signal in an incomplete form when said determining block determines that the usage of the software has reached the predetermined value.

3. A software usage management apparatus according to claim 2, wherein the signal is a video signal.

4. A software usage management apparatus according to claim 3, wherein said hindering block superimposes a second signal on the video signal and then outputs the superimposed signal when said determining block determines that the usage of the software has reached the predetermined value.

5. A software usage management apparatus according to claim 4, wherein the second signal is a character data signal for displaying a character.

6. A software usage management apparatus according to claim 3, wherein said hindering block inverts a polarity of the video signal and outputs the polarity-inverted signal when said determining block determines that the usage of the software has reached the predetermined value.

7. A software usage management apparatus according to claim 2, wherein dummy data is superimposed on the software, and
   said hindering block eliminates the dummy data from the software only when said determining block determines that the usage of the software is within the predetermined value and when the usage exceed the predetermined value leaves the dummy data superimposed thereby rendering the output unusable.

8. A software usage management apparatus according to claim 2, wherein the signal comprises a plurality of signals outputted in synchronism with each other, and
   said hindering block inhibits at least one of the plurality of signals from being outputted when said determining block determines that the usage of the software has reached the predetermined value.

9. A software usage management apparatus according to claim 8, wherein the plurality of signals include a video signal and an audio signal, and
   said hindering block inhibits the output of the audio signal while outputting the video signal when said determining block determines that the usage of the software has reached the predetermined value.

10. A software usage management apparatus according to claim 8, wherein the plurality of signals include a video signal and an audio signal, and
    said hindering block inhibits the output of the video signal while outputting the audio signal when said determining block determines that the usage of the software has reached the predetermined value.

11. A software usage management apparatus according to claim 2, wherein the signal includes an audio signal, and
    said hindering block stops the output of the audio signal and outputs an alarming sound signal when said determining block determines that the usage of the software has reached the predetermined value.

12. A software usage management apparatus according to claim 11, wherein said hindering means has a timer for controlling a period during which the alarming sound signal is outputted and alternately repeatedly outputs the audio signal and the alarming sound signal in accordance with said timer.

13. A software usage management apparatus according to claim 12, wherein said hindering block further comprises a counter for counting the number of operations of outputting the alarming sound signal and inhibits the outputs of the audio signal and the alarming sound signal when a count value of said counter reaches a predetermined value.

14. A software usage management apparatus according to claim 11, further comprising a timer to restrict a duration during which the alarming sound signal is outputted, whereby after the duration no sound and no audio signal is outputted.

15. A software usage management apparatus according to claim 2, wherein the signals comprise a computer program, and
    said hindering block outputs an image signal program which runs when starting up a computer, connected to said software using quantity managing apparatus, so as to display an alarm, when said determining block determines that the usage of the software has reached a predetermined value.

16. A software usage management apparatus, comprising:

software having dummy data rendering the software invaluable unless the dummy data is stripped;

a detector to detect a usage of software and outputting a value indicating the usage of the software;

a determining block to determine when the usage of the software detected by said detector has reached a predetermined value; and a hindering block to strip the dummy data superimposed on the software from the software only when said determining block determines that the software using quantity is within the predetermined value.

17. A software usage management apparatus comprising:

a detector to detect usage of the software and outputting a value indicating a usage of the software;

a determining block to determine when the usage of the software detected by said detector has reached a predetermined value; and means for outputting an image signal program when starting up a computer, connected to said software use management apparatus, so as to display an alarm sentence on the computer when said determining block determines that the usage of the software has reached a predetermined value.

* * * * *